United States Patent [19]
Hawkins et al.

[11] Patent Number: 5,133,076
[45] Date of Patent: Jul. 21, 1992

[54] HAND HELD COMPUTER

[75] Inventors: Jeff C. Hawkins; Ken L. Dulaney, both of Redwood City; John J. Daly, San Carlos; James H. McNamara, Santa Cruz; James F. Cole, Palo Alto, all of Calif.

[73] Assignee: Grid Systems Corporation, Fremont, Calif.

[21] Appl. No.: 365,147

[22] Filed: Jun. 12, 1989

[51] Int. Cl.$^5$ .............................. G06F 15/76
[52] U.S. Cl. ...................... 395/800; 364/709.09; 364/231; 364/231.1; 364/231.2
[58] Field of Search ............ 364/707, 708, 709.11, 364/200 MS File, 900 MS File, 709.09, 709.13; 395/275, 800

[56] References Cited

U.S. PATENT DOCUMENTS

| | | | |
|---|---|---|---|
| 3,916,386 | 10/1975 | Teixeira et al. | 364/900 |
| 4,038,535 | 7/1977 | Aldridge et al. | 364/900 |
| 4,317,180 | 2/1982 | Lies | 364/900 |
| 4,360,892 | 11/1982 | Endfield | 364/900 |
| 4,475,239 | 10/1984 | van Raamsdonk . | |
| 4,545,023 | 10/1985 | Mizzi | 364/708 |
| 4,591,974 | 5/1986 | Dornbush et al. | 364/200 |
| 4,654,818 | 3/1987 | Wetterau, Jr. | 364/900 |
| 4,777,590 | 10/1988 | Durkos et al. | 364/200 |
| 4,785,564 | 11/1988 | Gurtler . | |
| 4,916,441 | 4/1990 | Gombrich | 364/709.11 |

OTHER PUBLICATIONS

*Popular Science*, Nov. 1980, by Smay entitled "Hand Held Computers".
*Byte*, Jan. 1981, by Williams et al., entitled "The Panasonic and Quasar Hand Held Computers".
*Microcomputing*, Apr. 1983, by Derflet, Jr., entitled "Life in the Fast Lane with Portables".
*Byte*, Jun. 1983, by Roberts, entitled "Sunrise Systems".
*Byte*, Jun. 1983, by Wszola, entitled "NEC PC-8201 Portable Computer".
*High Technology*, Sep. 1983, by Lu, entitled "Dawn of the Portable Computer".

*Primary Examiner*—Michael R. Fleming
*Assistant Examiner*—Debra A. Chun
*Attorney, Agent, or Firm*—Townsend & Townsend

[57] ABSTRACT

A hand held computer of a type used for such activities as taking inventory, recording signatures on delivery, keeping a route agenda, etc. has a large screen and preferably is without a built in keyboard. The tablet type computer is thin in profile, light in weight and is easily carried and used. Programming in the computer enables an operator to select from various forms available for display on the screen, enables character recognition for items printed on the screen using a conductive stylus, enables the recording in memory of signatures, graphics or any other material entered on the screen, and enables other convenient functions. Certain preferred features of the computer enable it easily to be converted into a full function desk top computer with a keyboard, expansion module and stand.

19 Claims, 24 Drawing Sheets

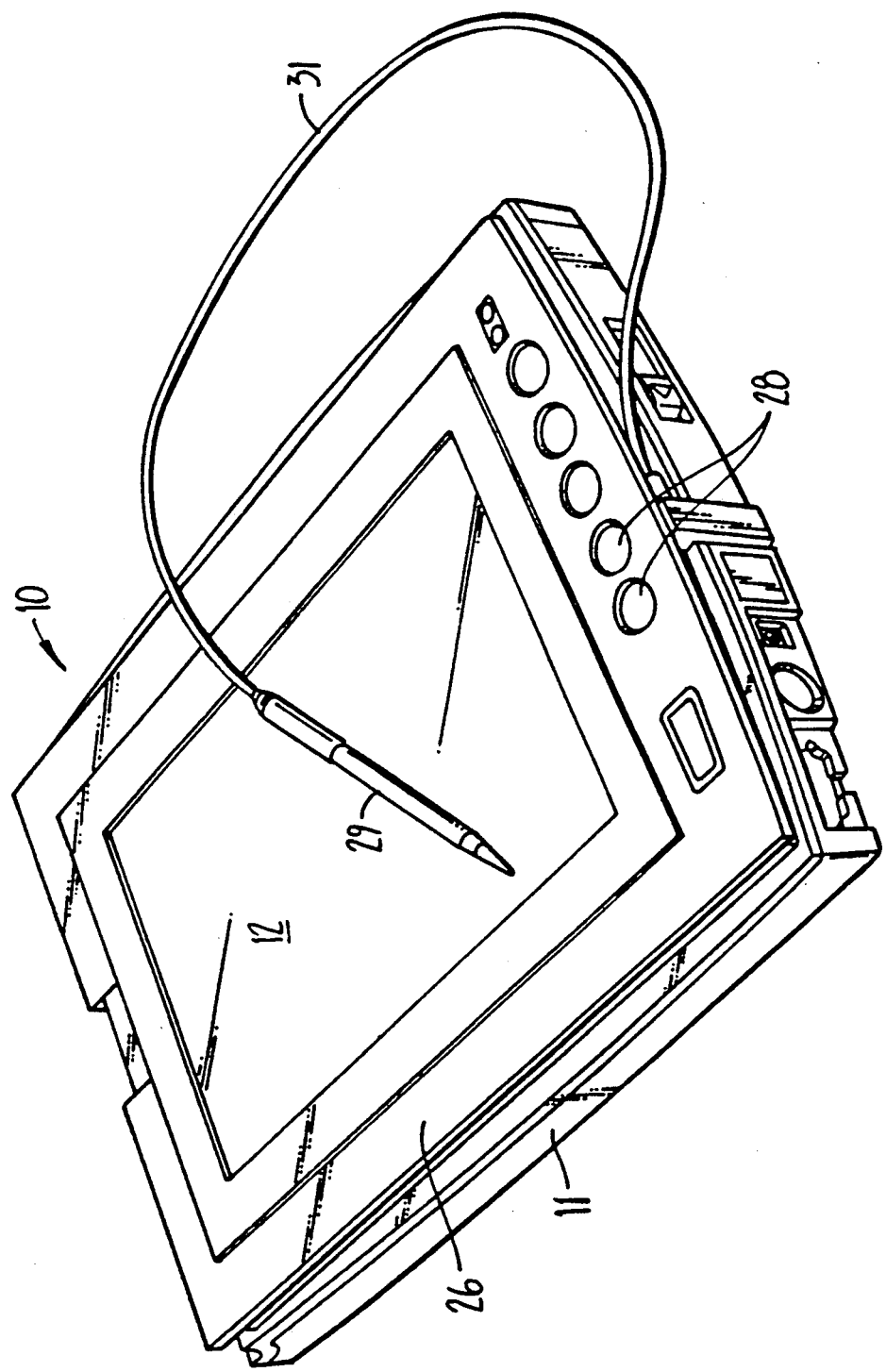
FIG._1.

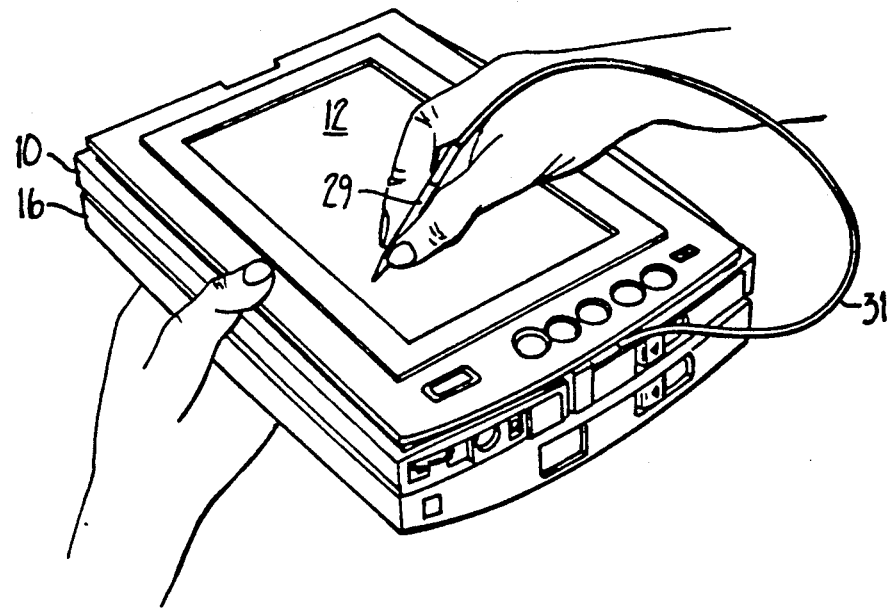
FIG._2A.
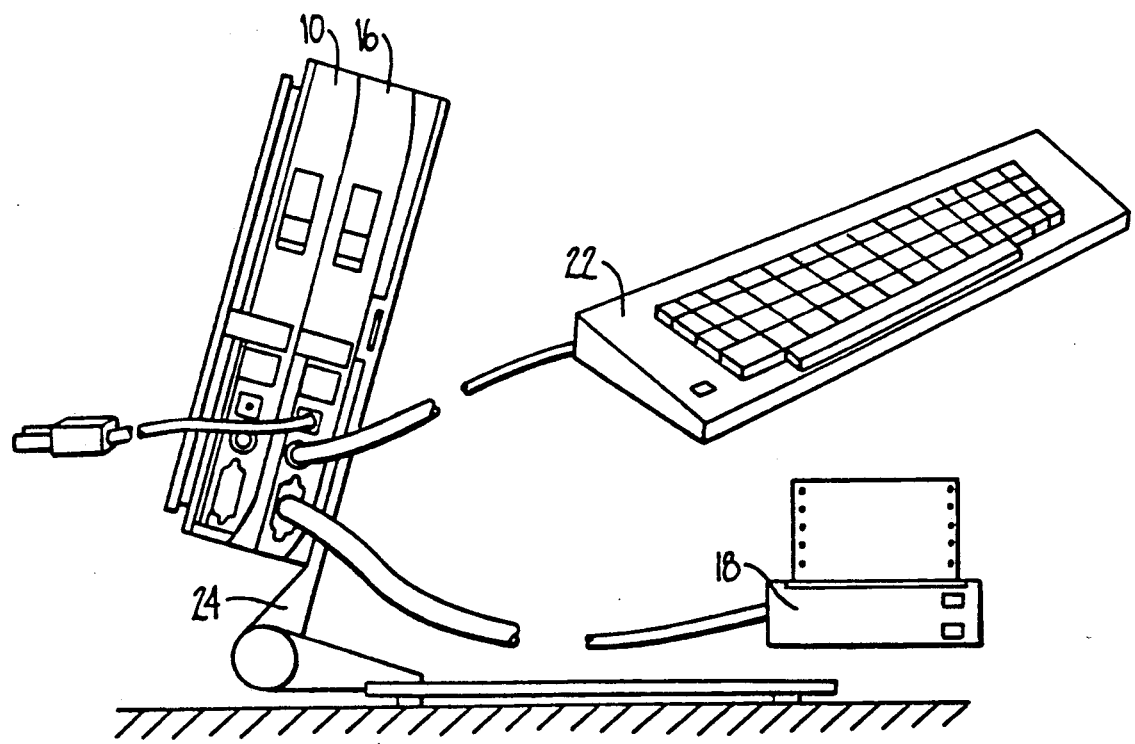
FIG._2B.

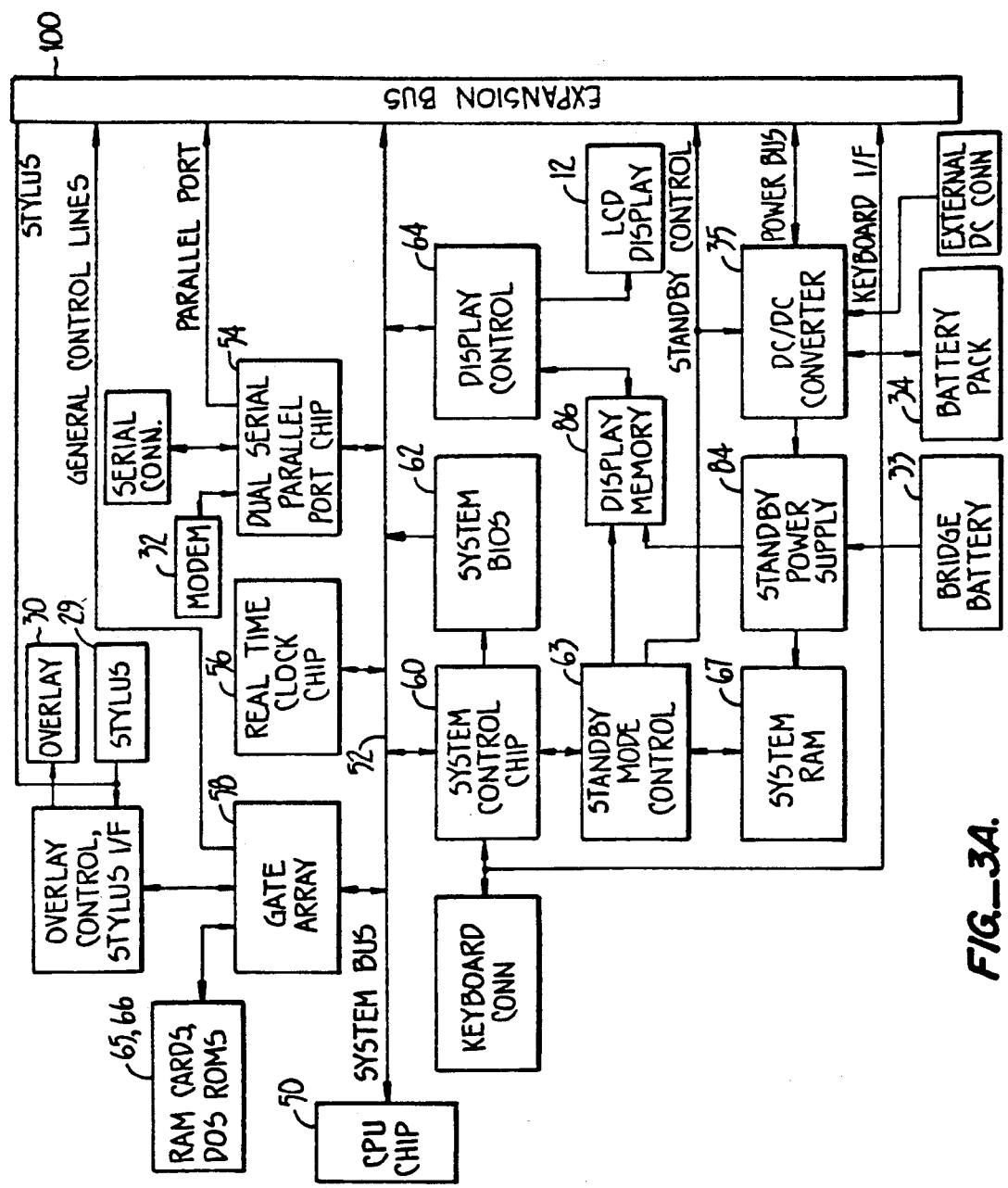
FIG._3A.

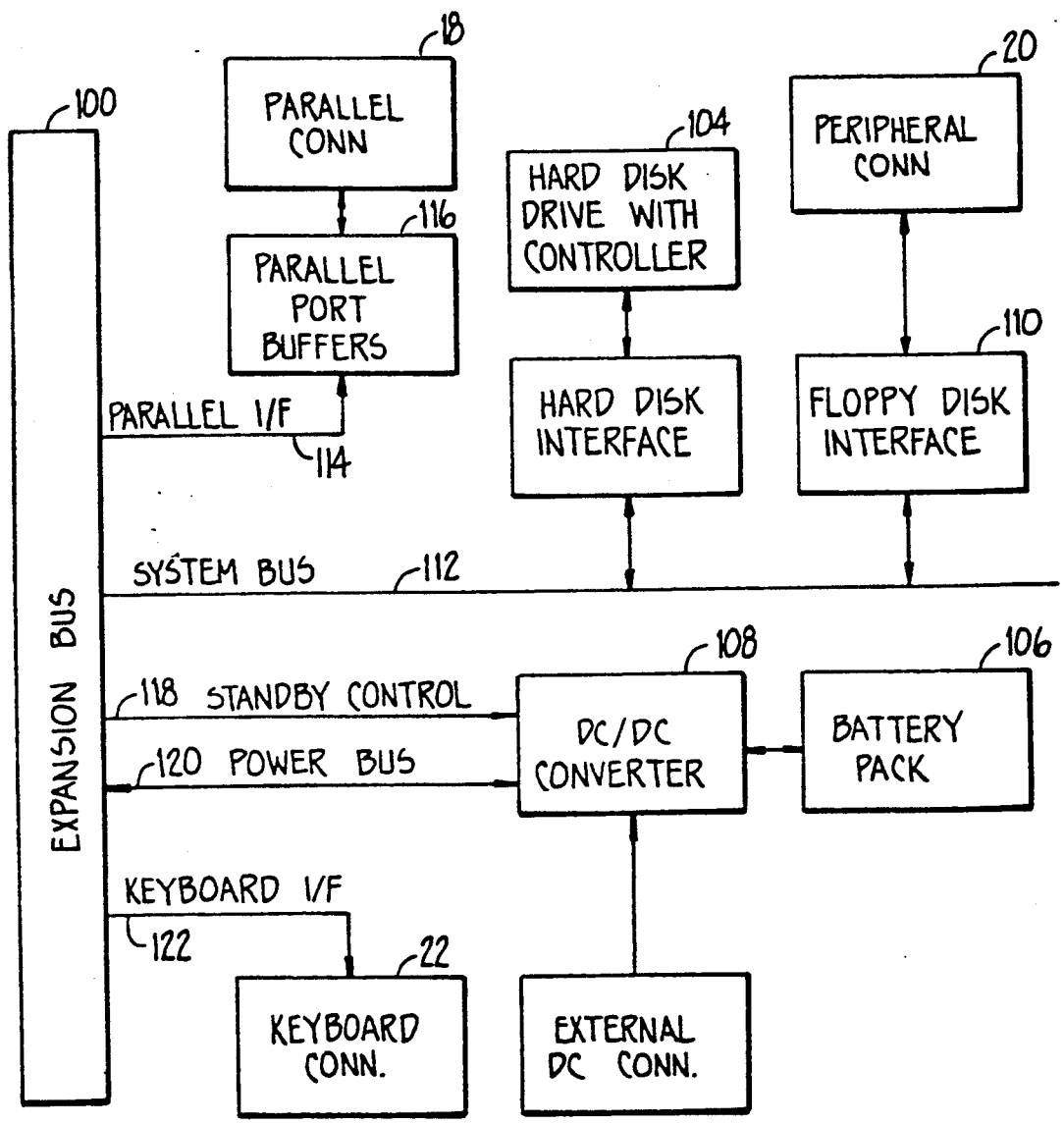
FIG._3B.

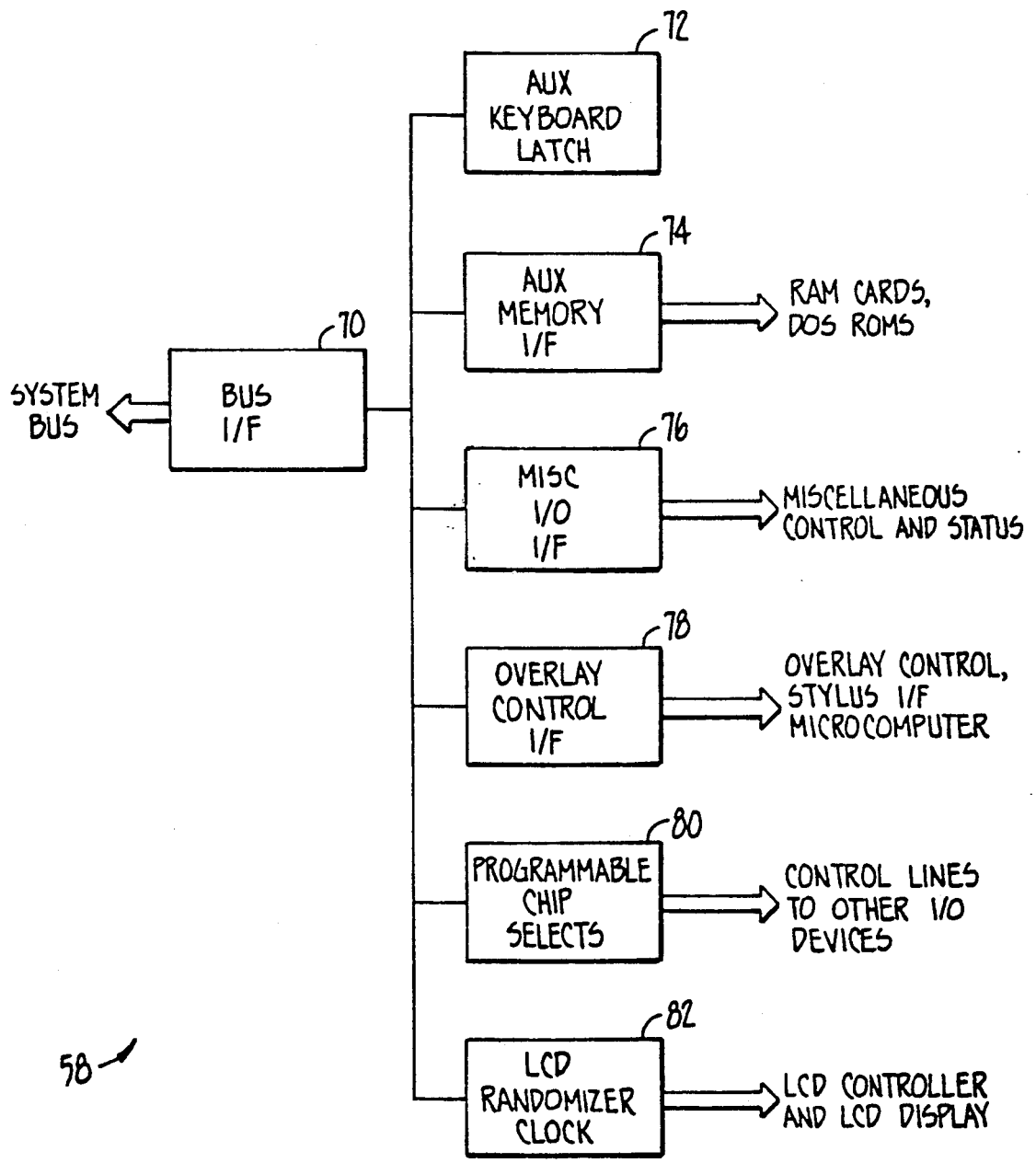
FIG._4.

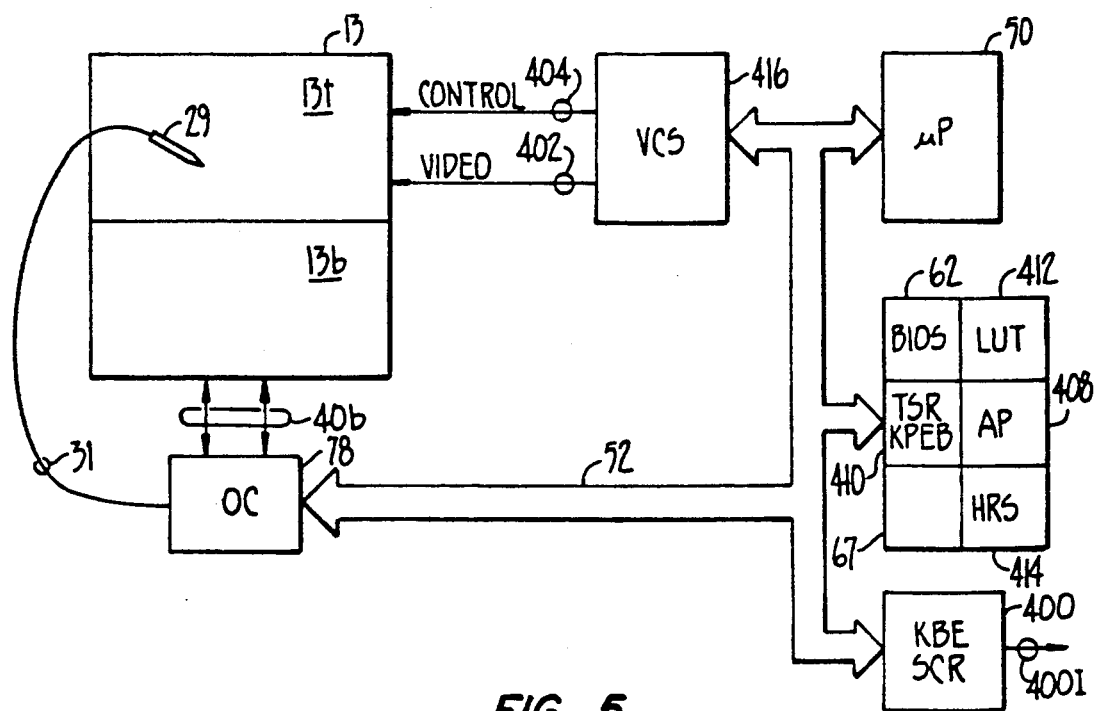
FIG._5.
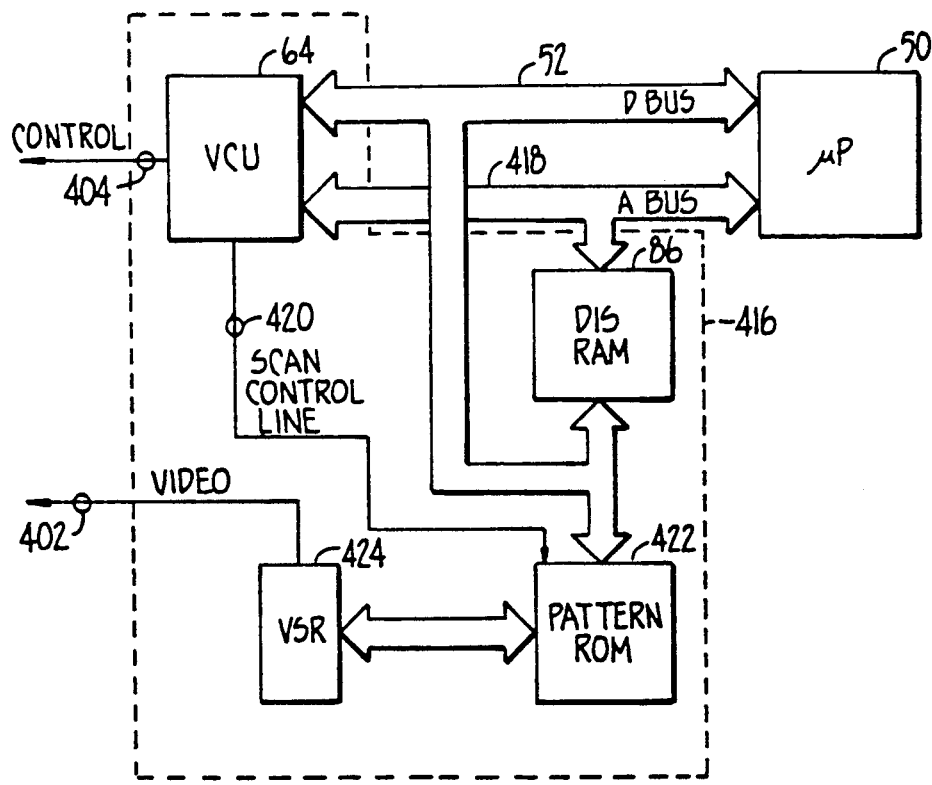
FIG._7.

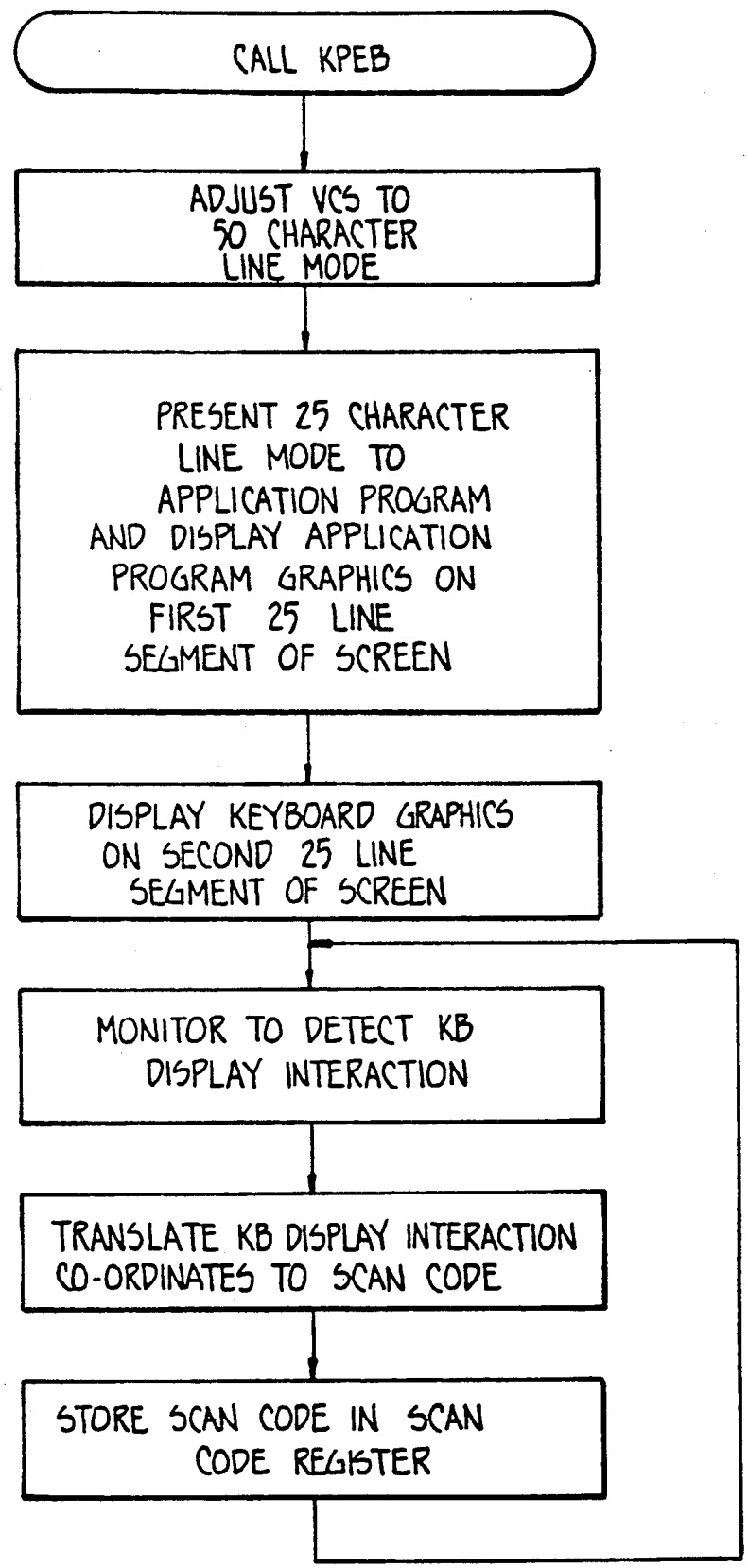
FIG._6.

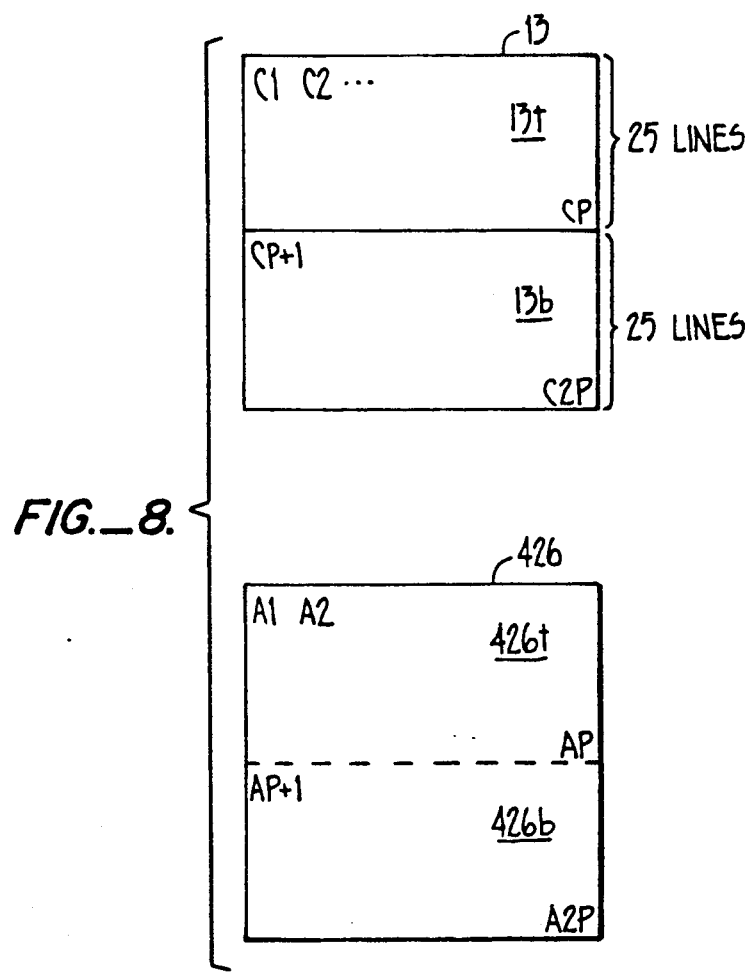
FIG._8.
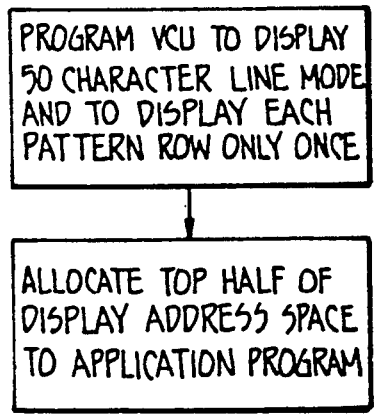
FIG._9.

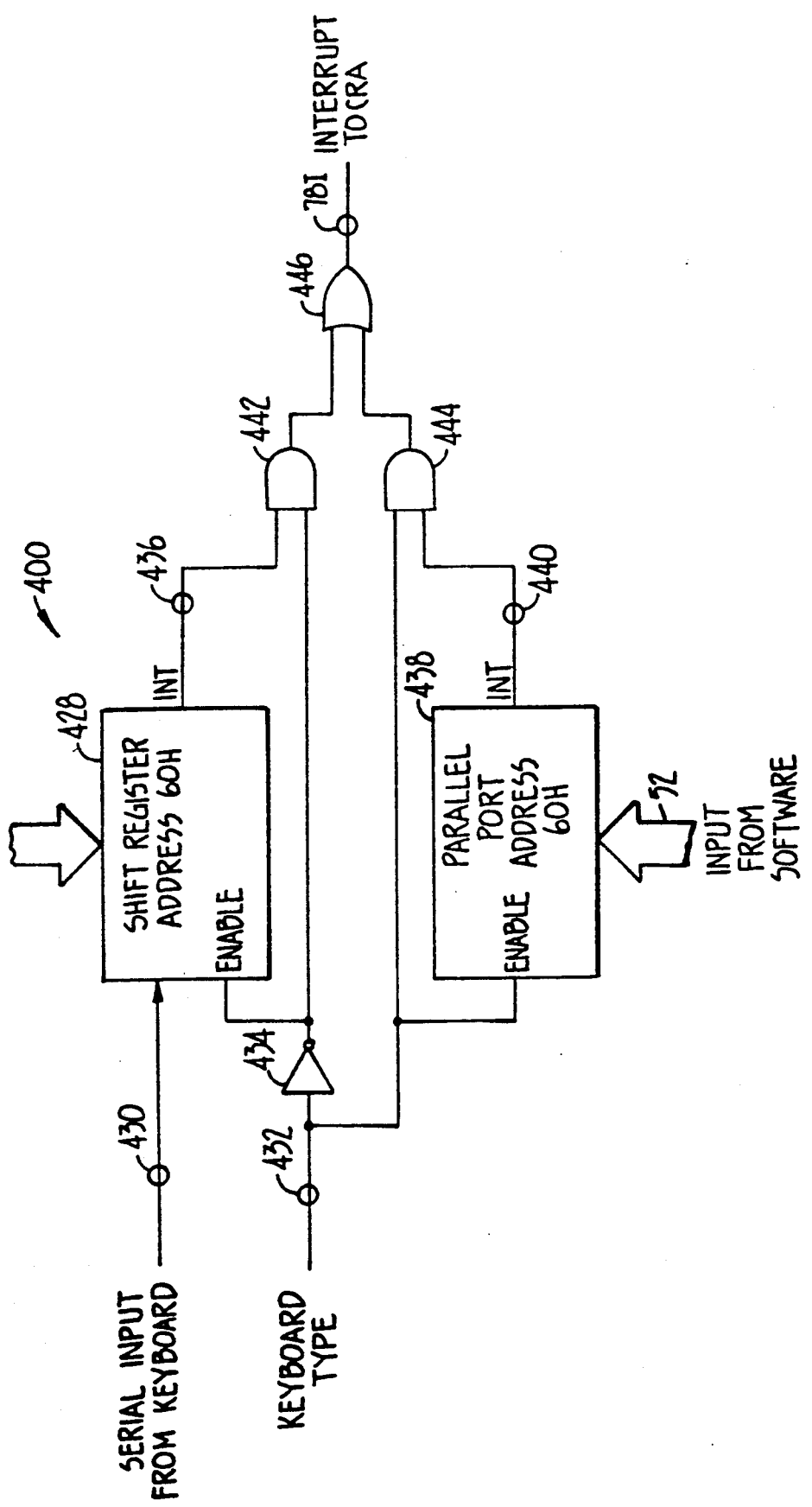
FIG._10.

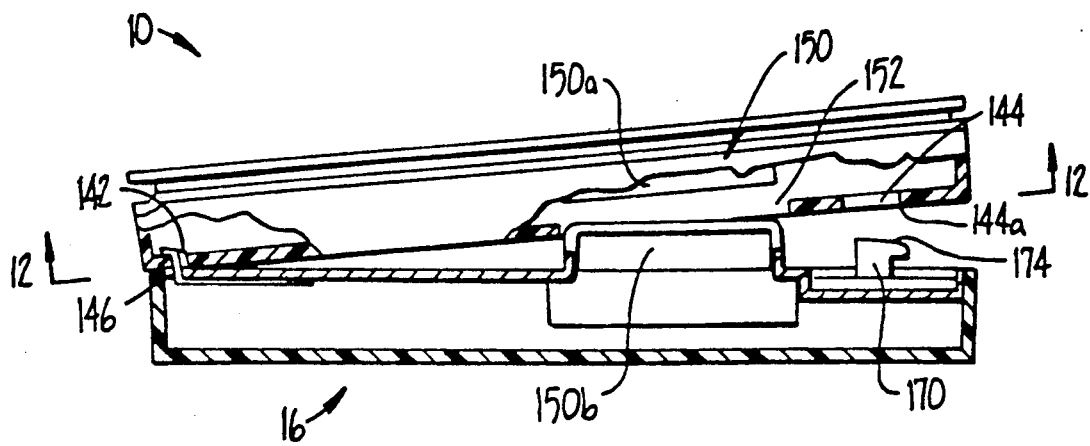
FIG._11.
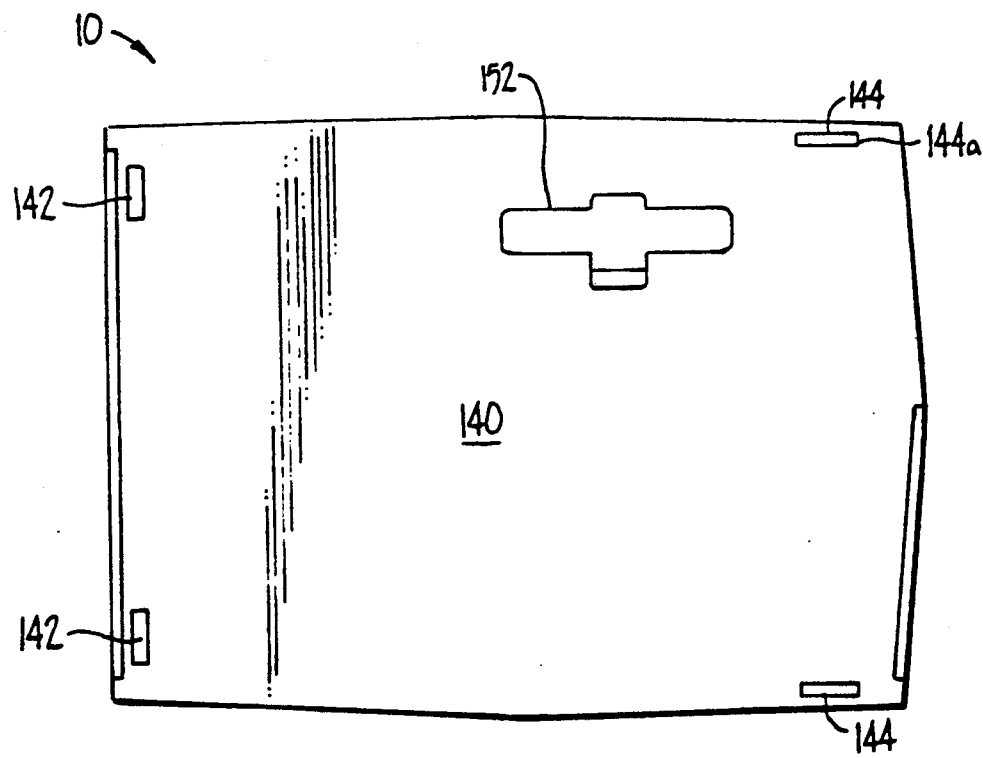
FIG._12.

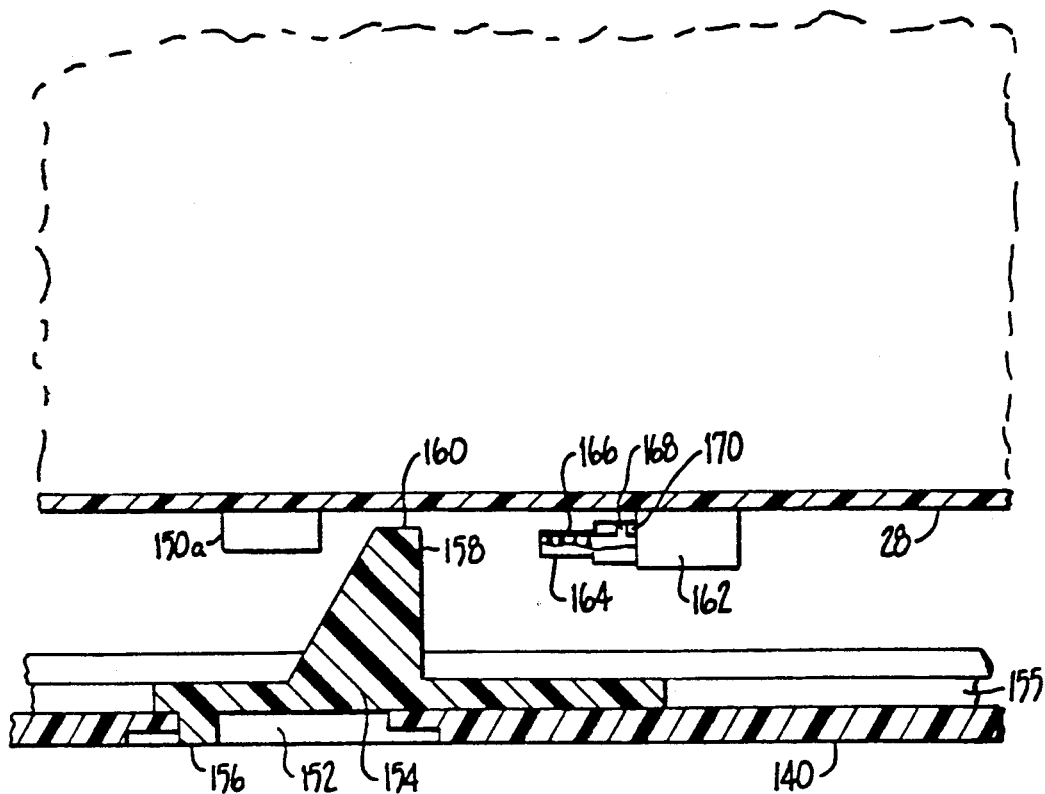
FIG._13.
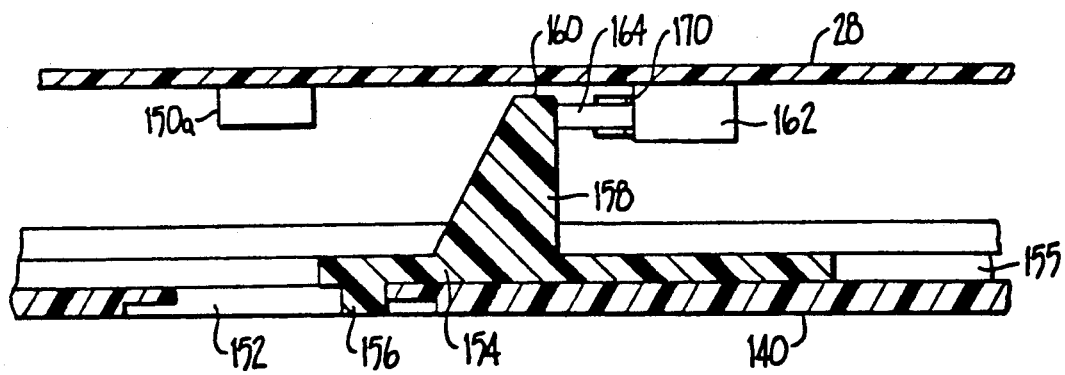
FIG._14.

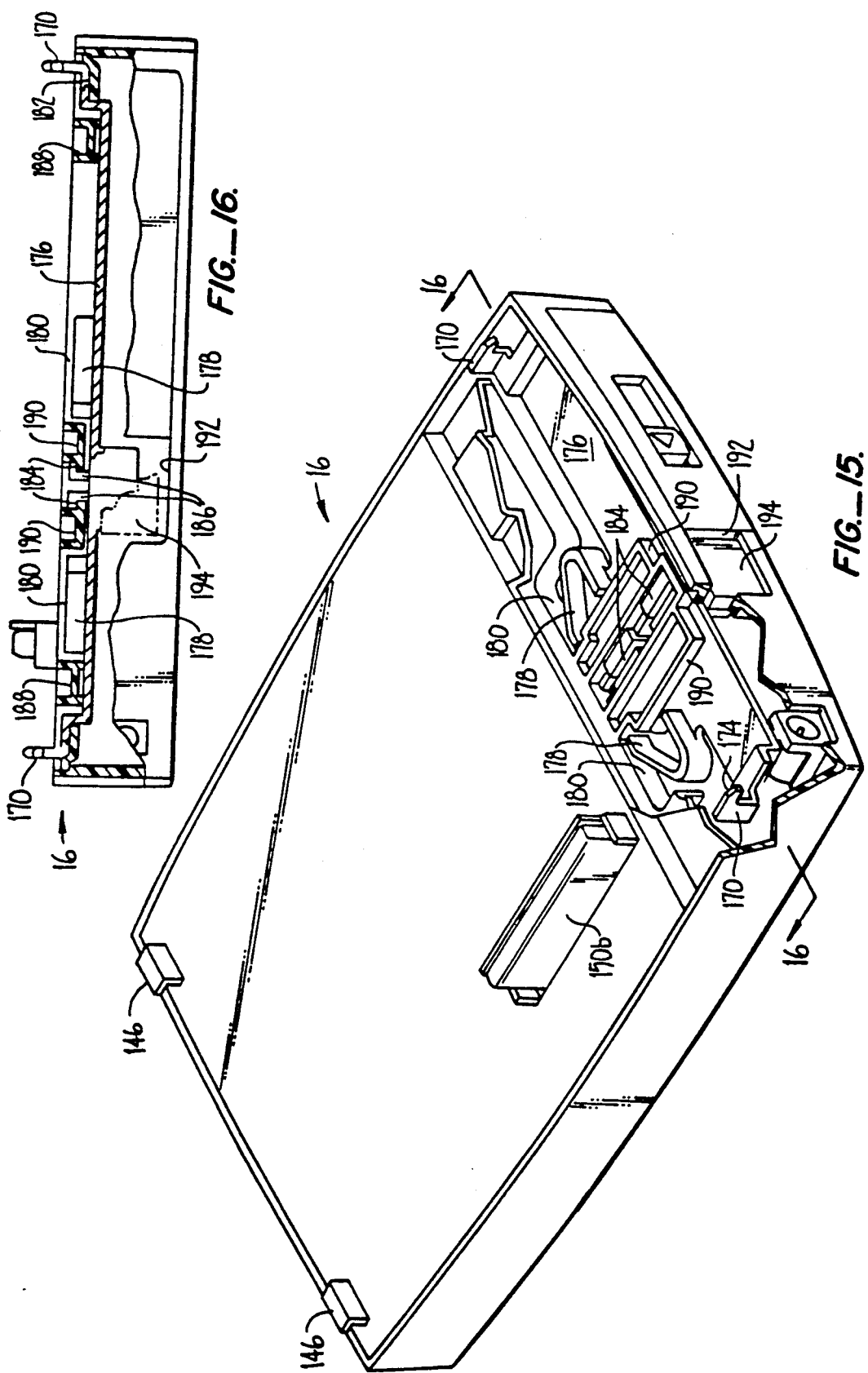

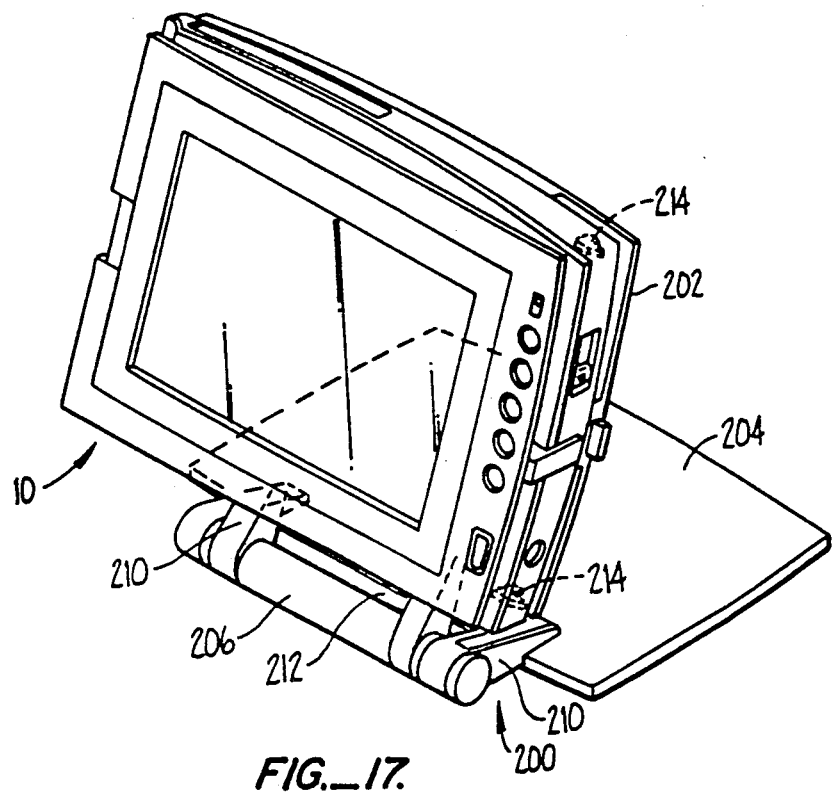
FIG._17.
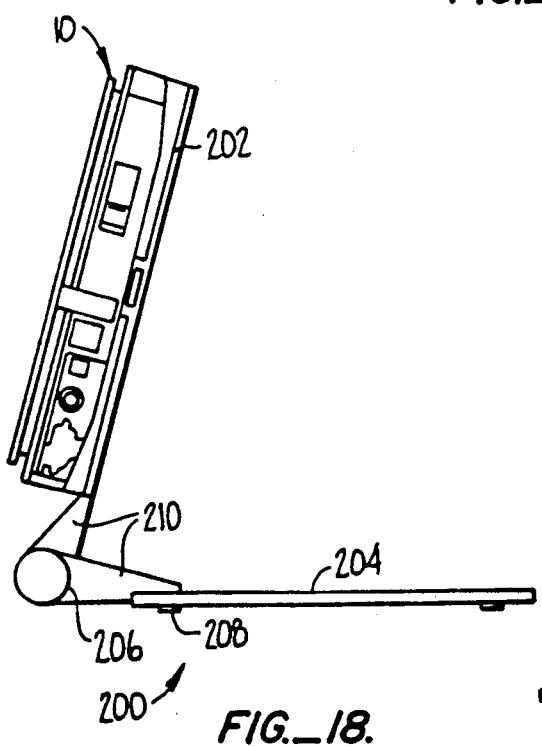
FIG._18.
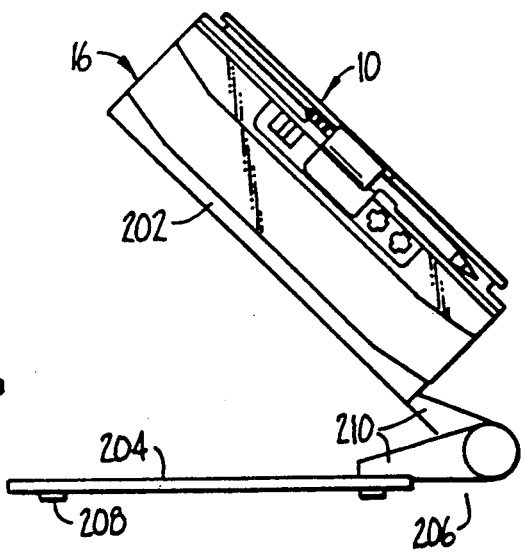
FIG._19.

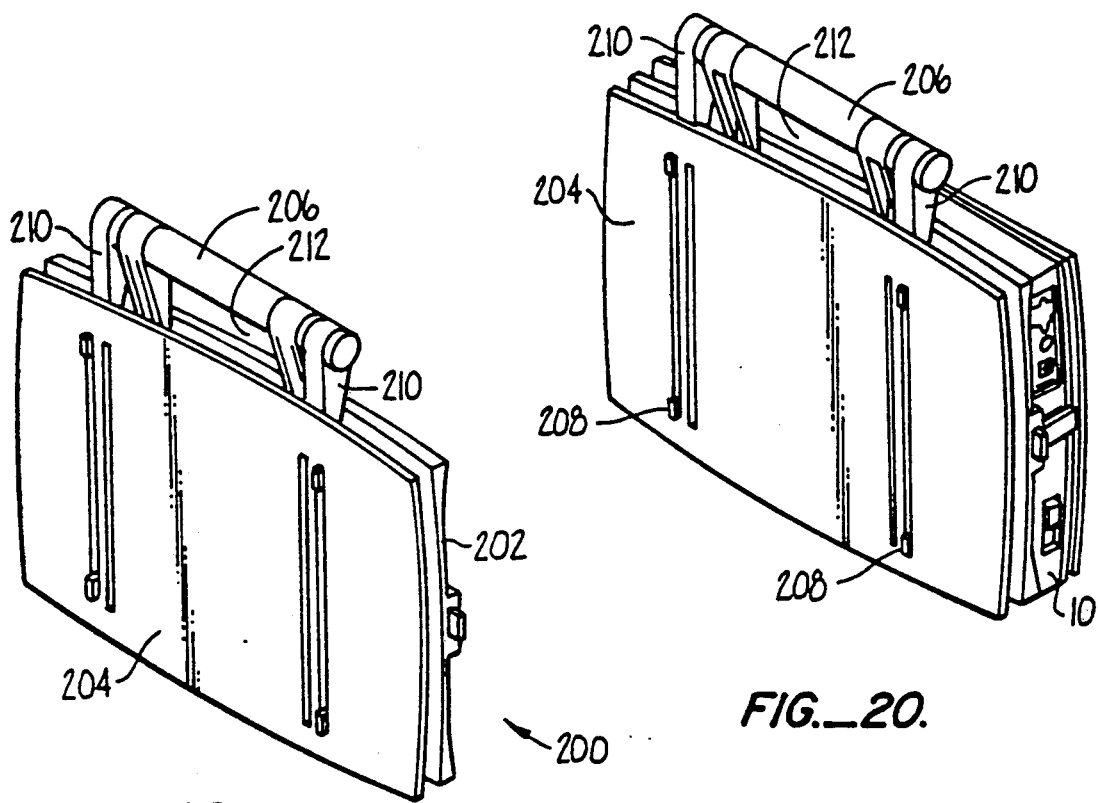
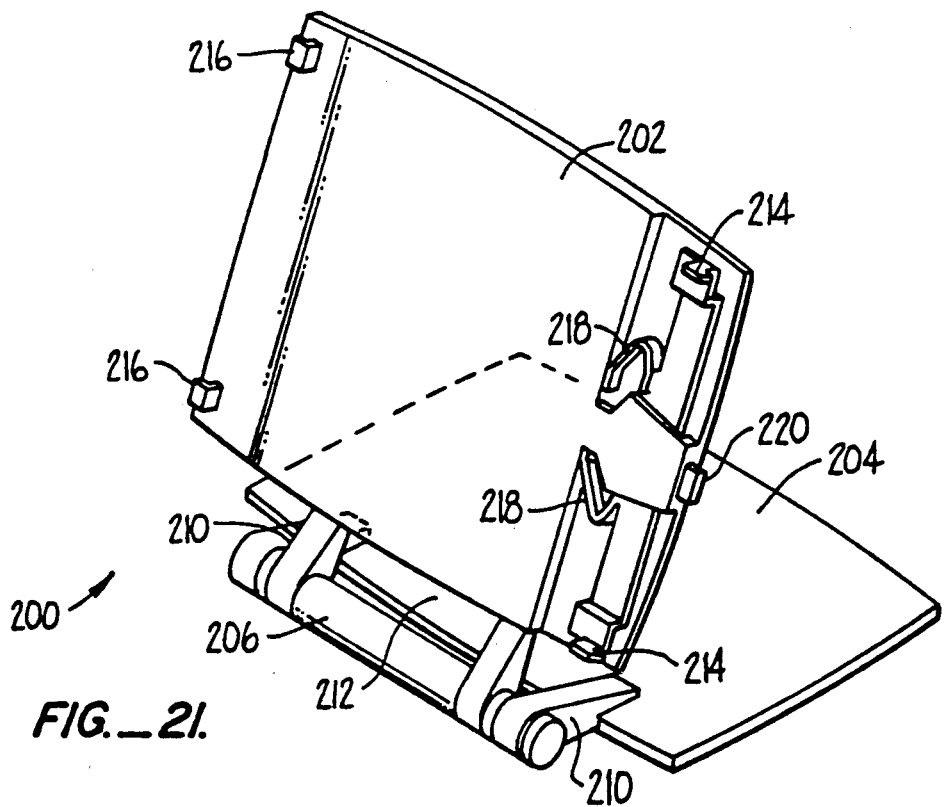
FIG._22.
FIG._20.
FIG._21.

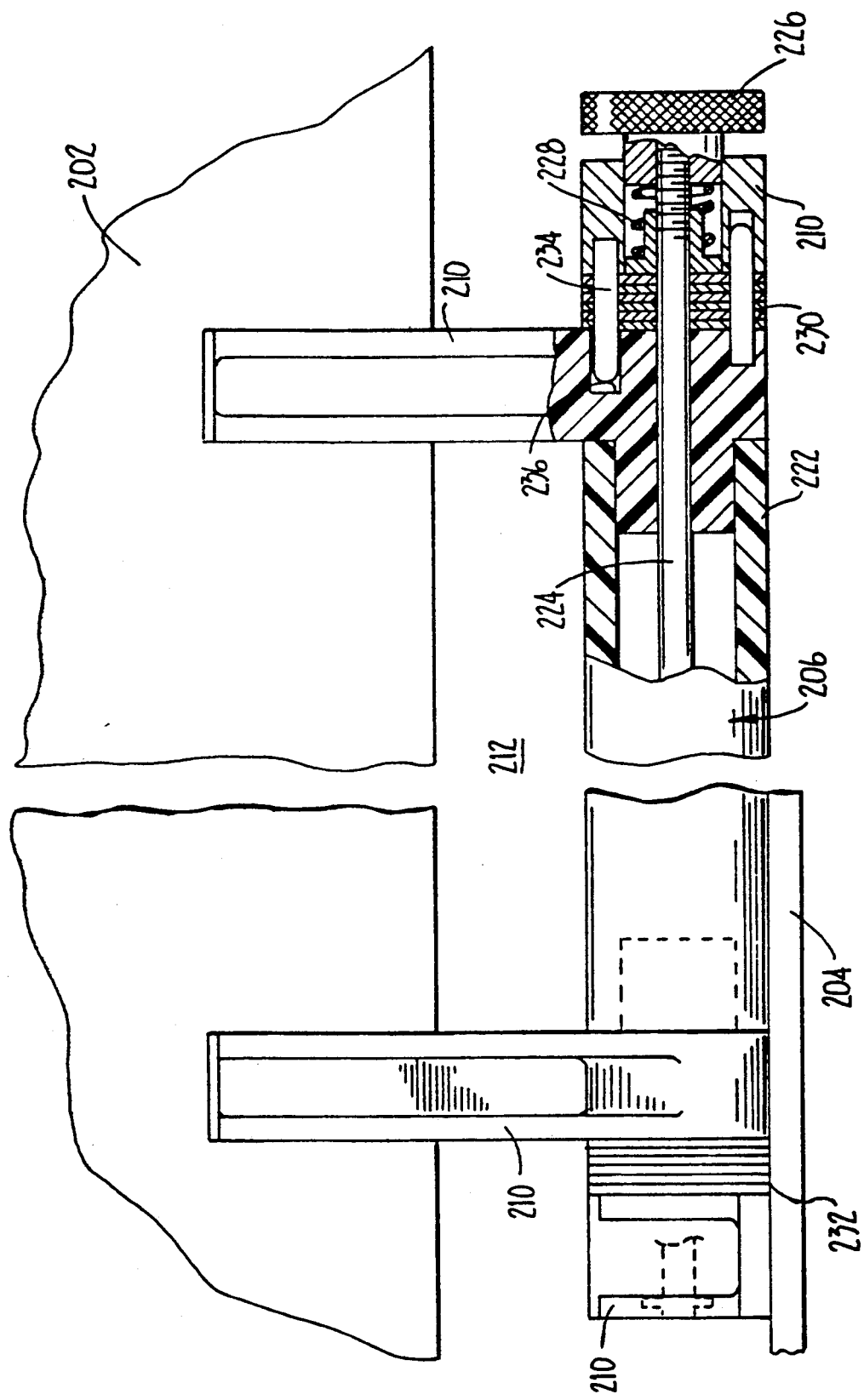
FIG._23.

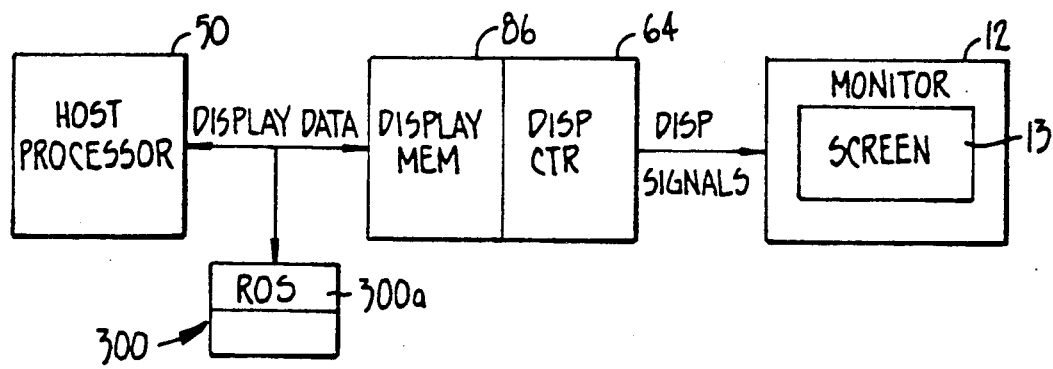
FIG._24.
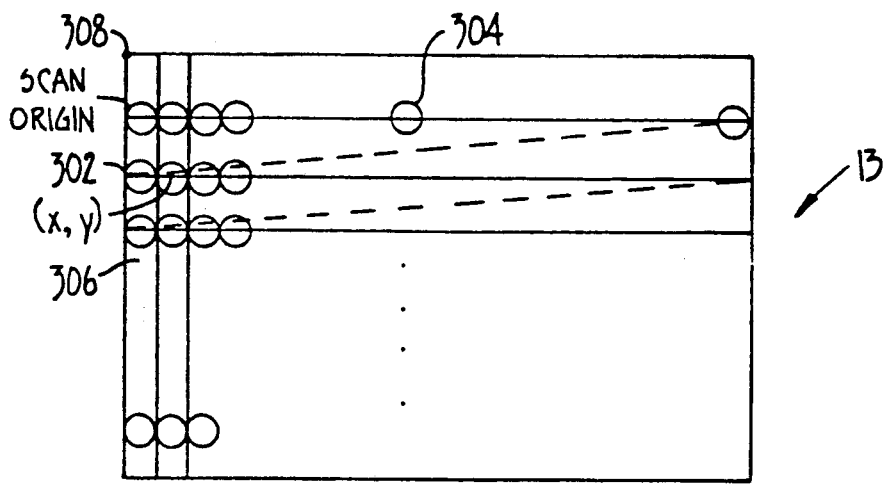
FIG._25.
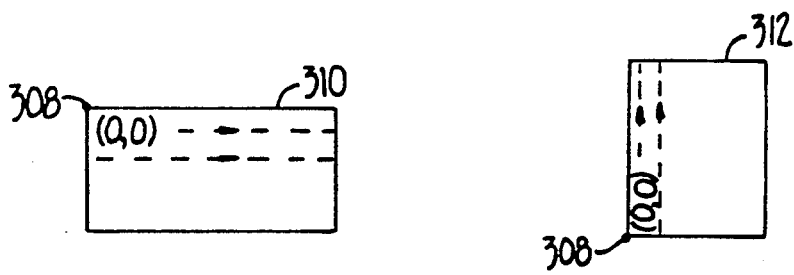
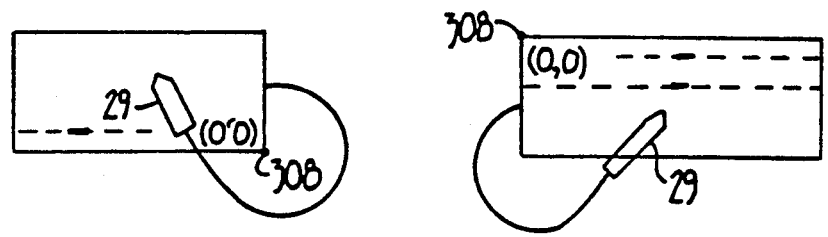
FIG._26.

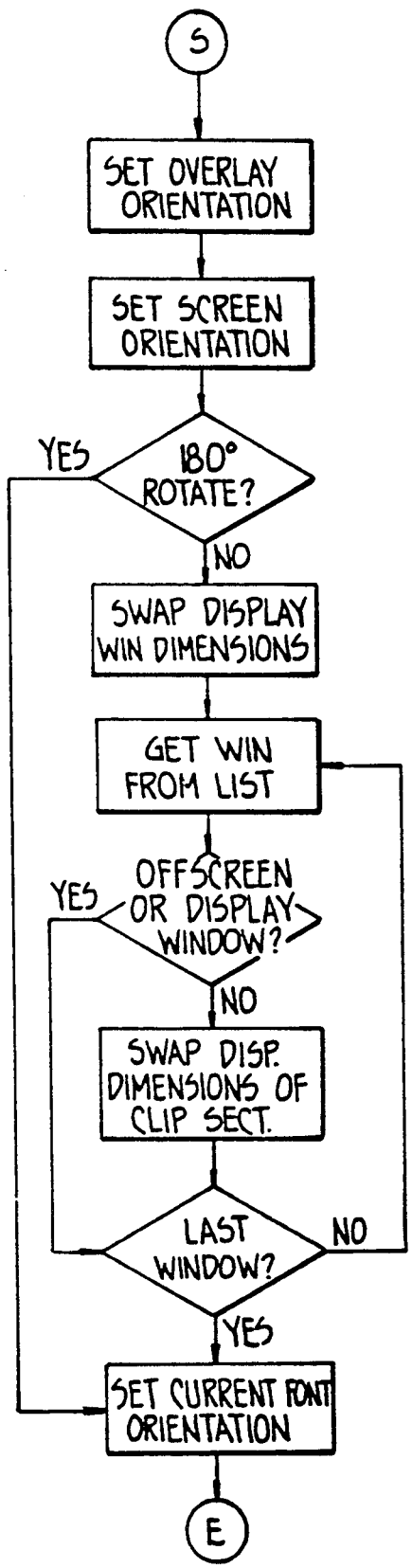
FIG._27.

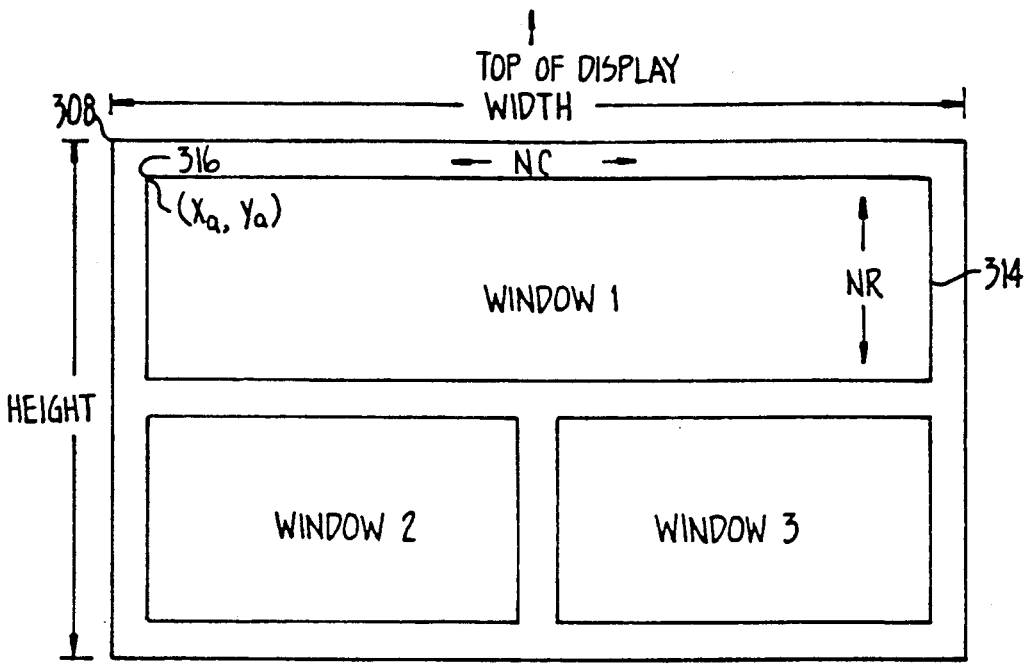
FIG._28A.   UNROTATED
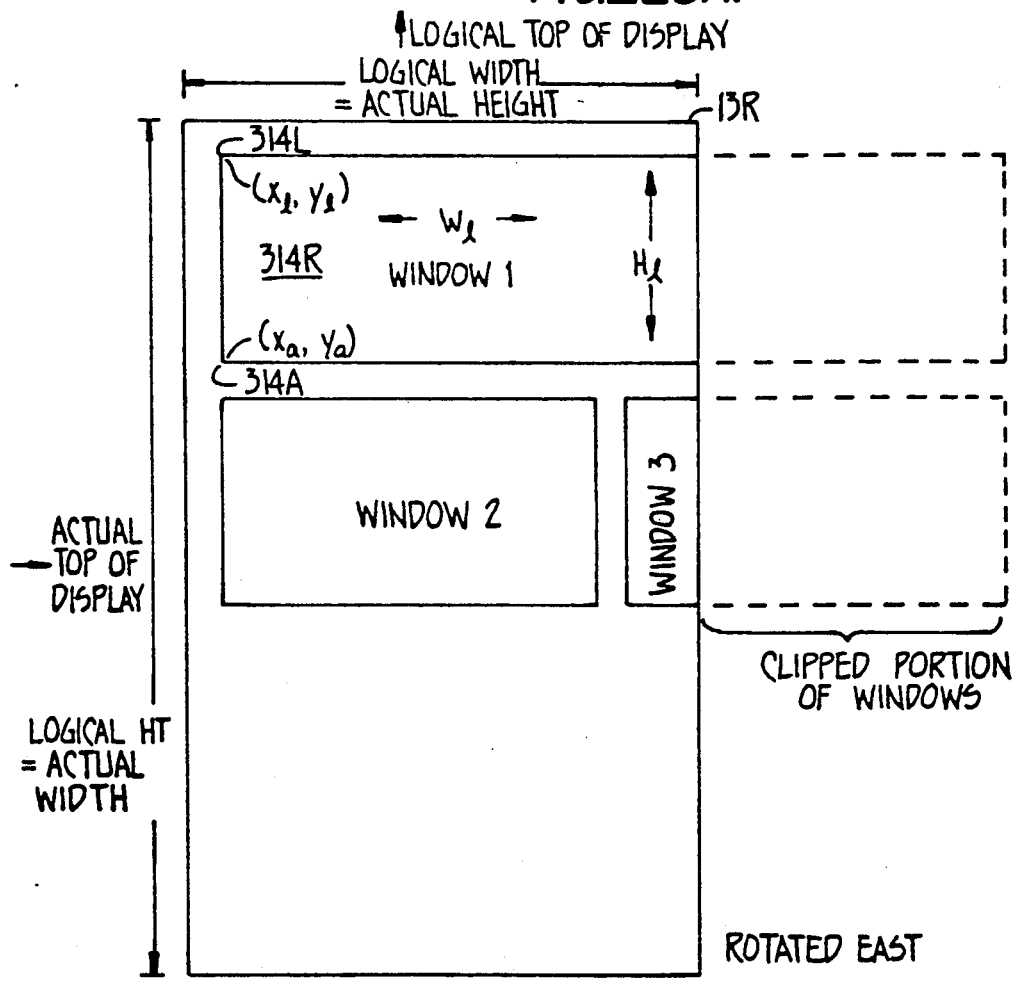
FIG._28B.

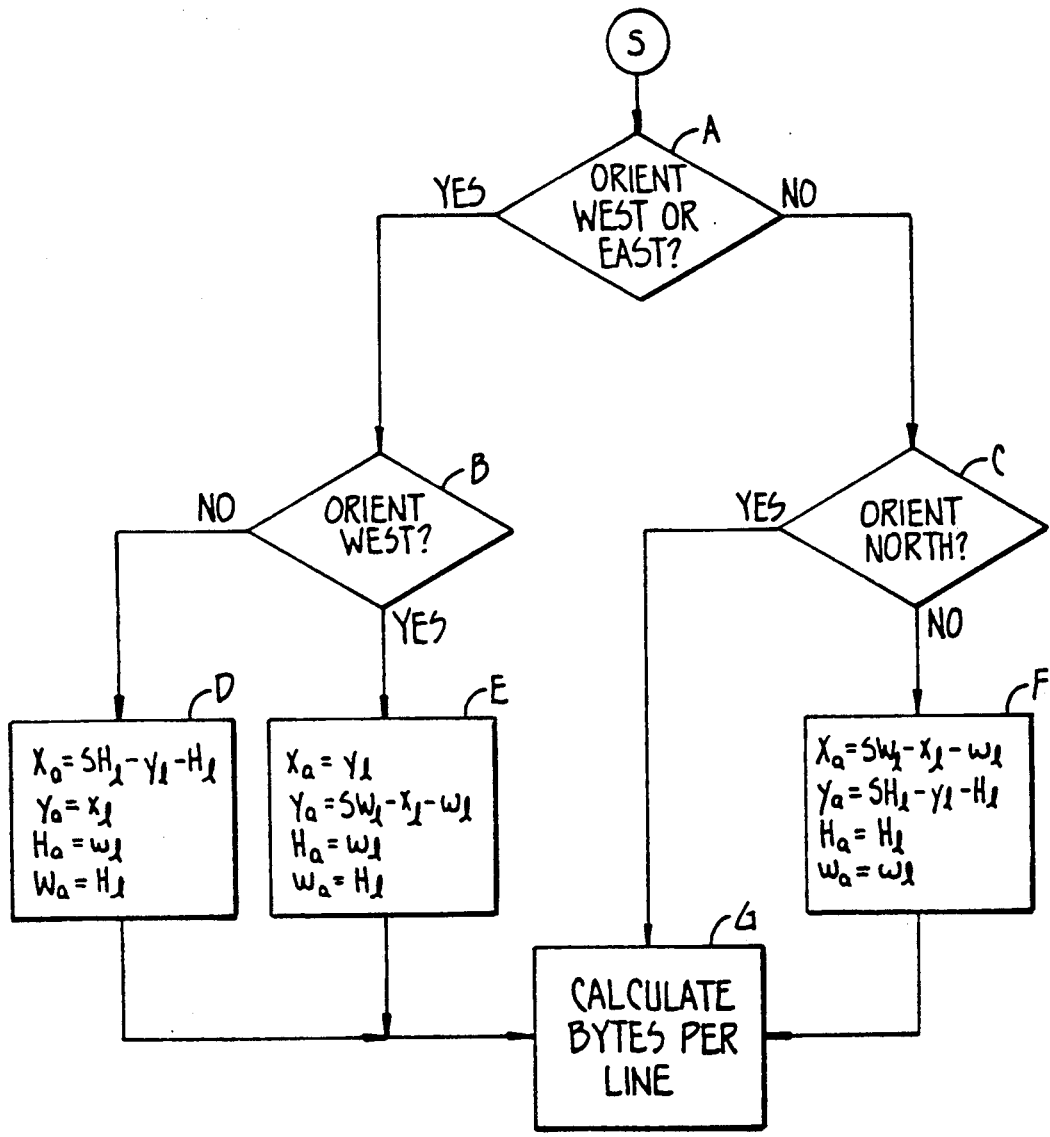
FIG._29.

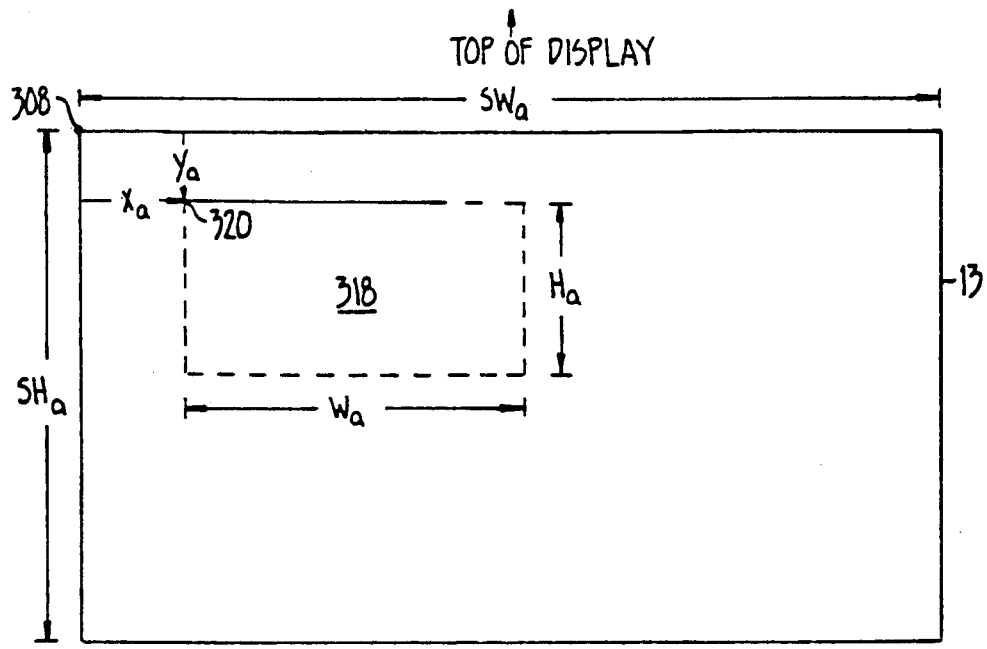
FIG._30A.   UNROTATED
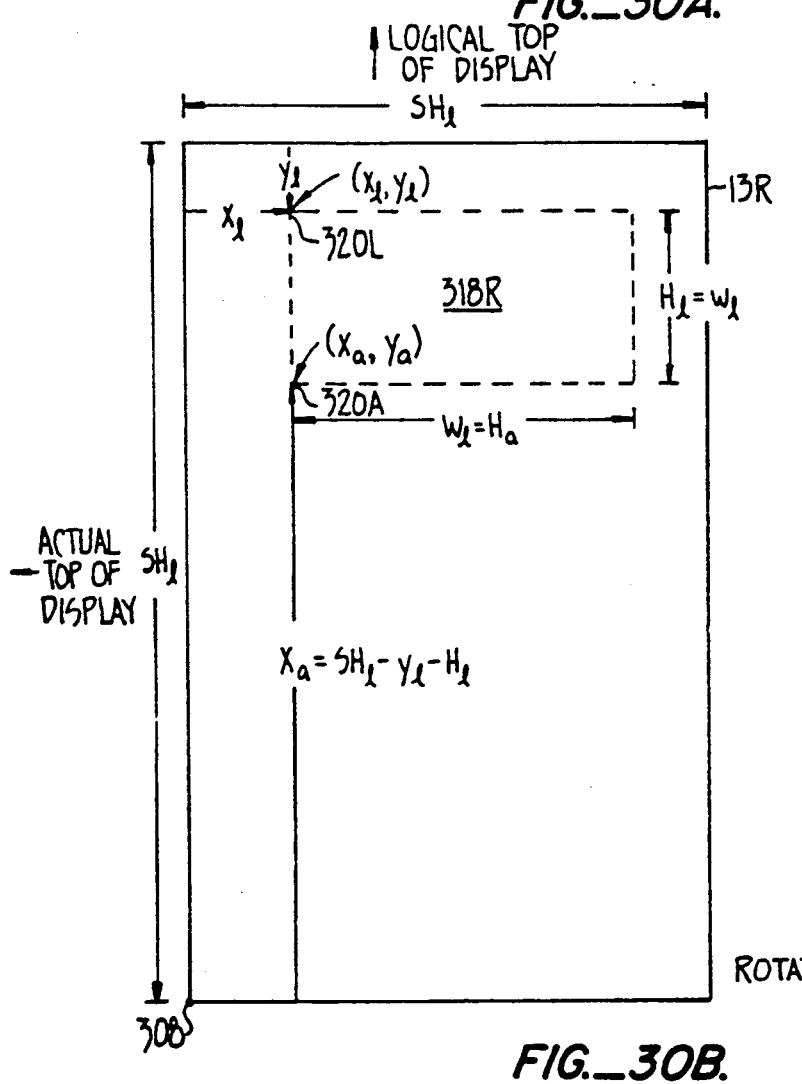
FIG._30B.   ROTATED EAST

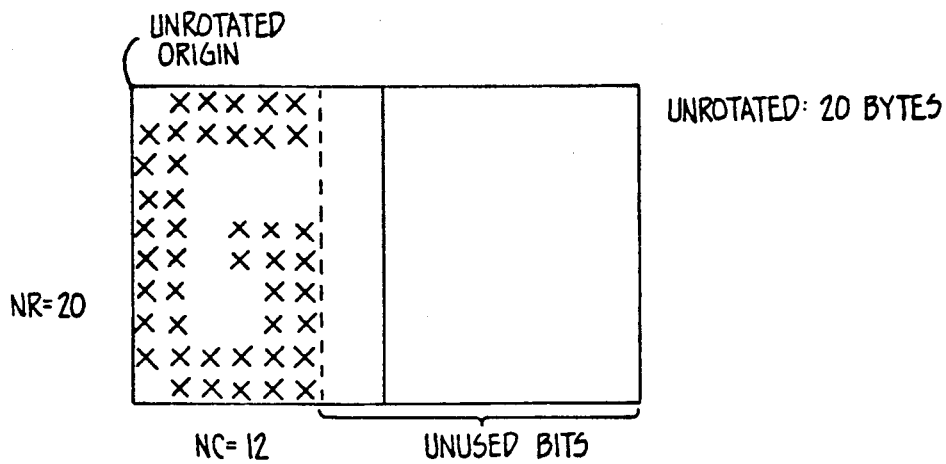
FIG._31A.
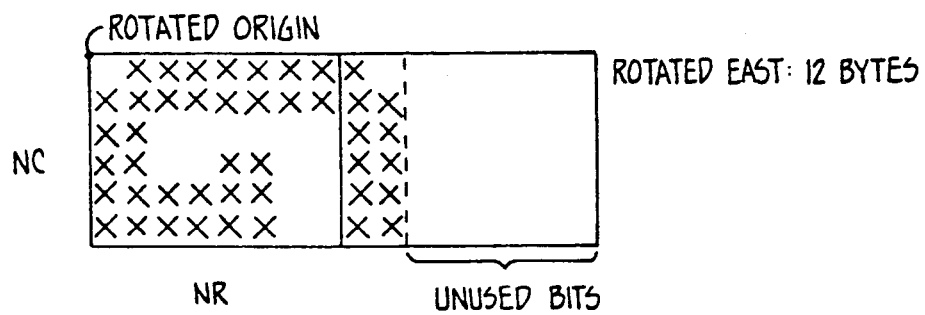
FIG._31B.
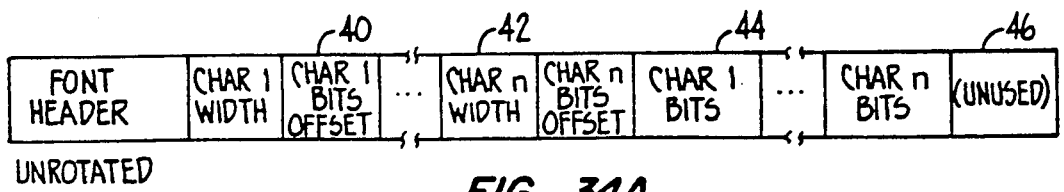
UNROTATED
FIG._34A.
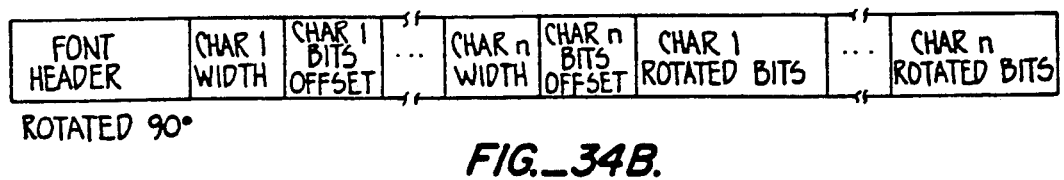
ROTATED 90°
FIG._34B.

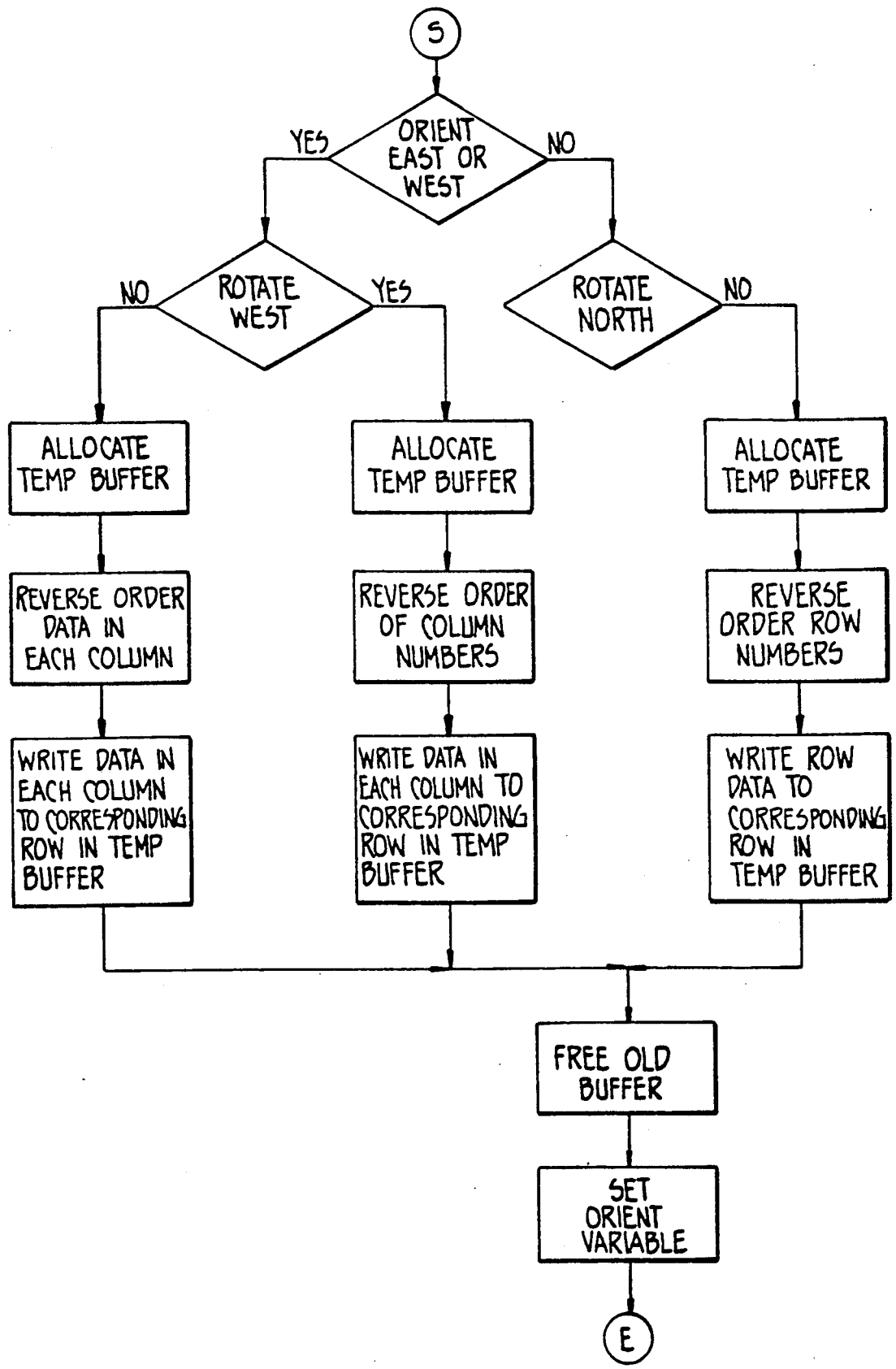
FIG._32.

FIG._33A. UNROTATED

FIG._33B. ROTATE EAST

FIG._33C. ROTATE WEST

FIG._33D. ROTATE SOUTH

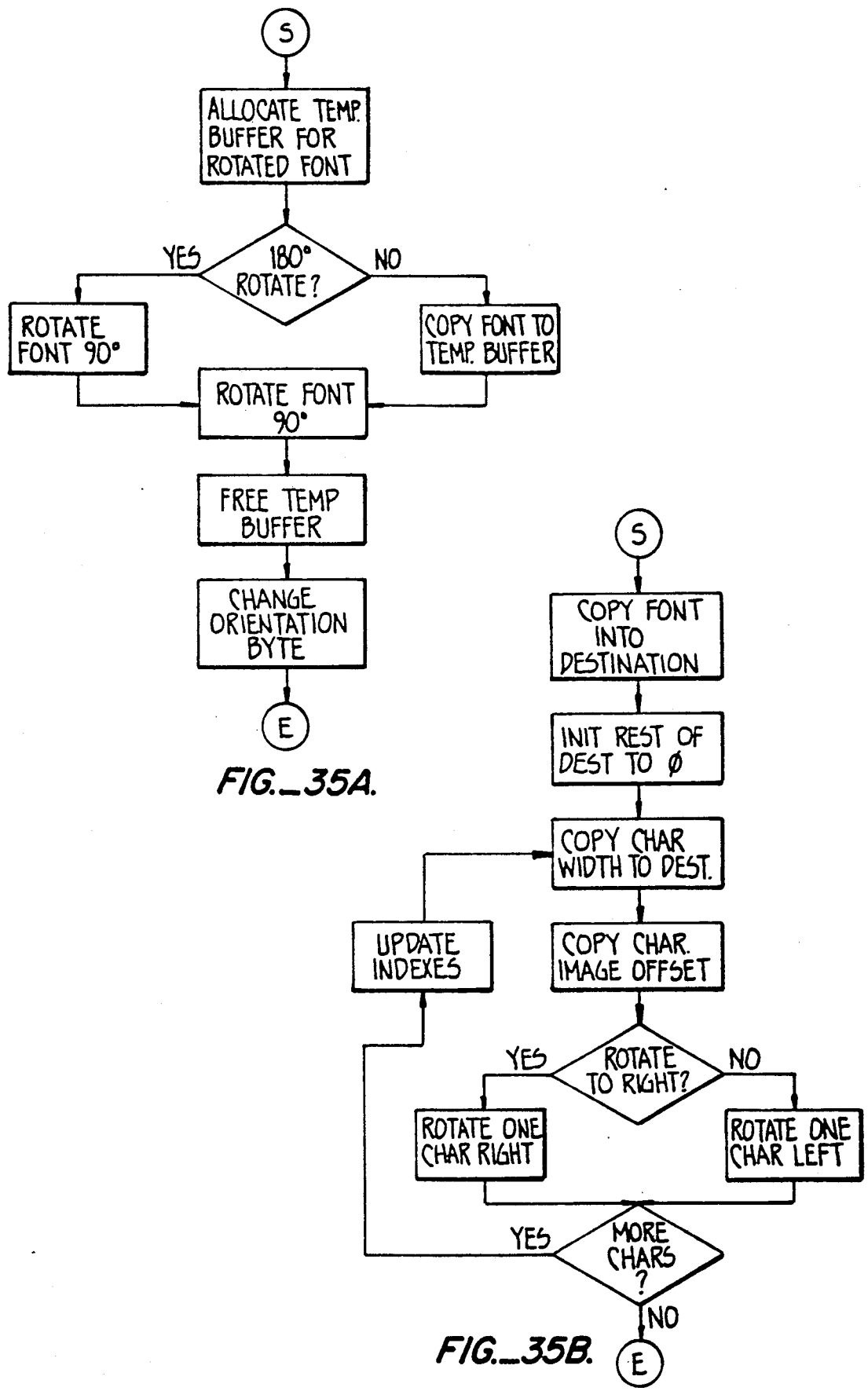
FIG._35A.
FIG._35B.

HAND HELD COMPUTER

BACKGROUND OF THE INVENTION

This invention relates to computers in general and to hand held computers in particular.

Computers have long been used to collect, arrange, process and store data. While the potential applications are limitless, the actual use of computers for information management has been limited in certain user environments due to some drawbacks of prior art computers. For example, hand held, portable data recording is desirable for taking store or warehouse inventories, for entering delivery route data, and for performing engineering diagnostics. Users in these environments have largely foregone the benefits of a computer's information management capabilities rather than give up the convenience of portable, hand held clipboards and notebooks to record the gathered information.

Single-handed data entry is another attribute lacking in many prior art computers. Keyboards are not conducive to entry with one hand; writing with pen and paper is certainly faster and more efficient than one-handed typing. Moreover, keyboards add to the size and weight of the computer and therefore work against the goals of hand held size and portability.

The form of one-handed data entry is also a consideration. Field data can, and often must, be recorded by filling in blanks or checking boxes on a preset form. Some data, however, can be adequately recorded only through a written description. To be a replacement for handwritten forms and reports, therefore, the hand held, portable computer must be able to record data on preset forms and through written descriptions. In addition, the user must be able to record the data with one hand.

The use of a computer solely to perform tasks for which paper forms and notebooks were formerly employed can be even more economically advantageous if the computer were useful for other tasks as well without sacrificing the hand held size, portability or the single-handed data entry features. Thus, the computer must be versatile as well as being easy to use.

Conventional desktop personal computers are not portable in that they cannot be used in successive locations without considerable assembly and disassembly between locations. Conventional laptop computers, on the other hand, while portable, require an operating surface. To be truly hand held, the computer must be conveniently held in one hand and operated by the other. Neither desktop nor laptop computers can be used in environments requiring portable, hand held operation.

In addition, there are many hand held calculators on the market. Many of them are programmable and can save limited amounts of data. None, however, is versatile enough in its data processing, data storage or data input capabilities.

SUMMARY OF THE INVENTION

This invention is a hand held, portable computer into which data can be entered with one hand. The computer is encased in a housing of hand-sized dimensions. A liquid crystal display screen covers a majority of the top surface of the housing. Through the use of specialized software and a voltage gradient on the screen, an electric stylus may be used with the screen to enter data into the computer through handwriting recognition, through form selection, or via a keyboard emulated by a portion of the screen itself and operated by the stylus. This feature achieves the goal of one-handed data entry.

The computer has an expansion slab which may be used to expand the memory of the device, albeit at the expense of size and weight. In addition, the device has ports through which peripheral devices such as a conventional keyboard and a printer may be attached to convert the hand held computer into a desktop personal computer.

The preferred embodiment of this invention will be described with reference to the drawings.

BRIEF DESCRIPTION OF THE DRAWINGS

FIG. 1 is an elevational view of the hand held computer of this invention;

FIG. 2A is an elevational view of the computer and expansion module of this invention in hand held operation:

FIG. 2B is an elevational view of the computer and expansion module of this invention in desktop operation;

FIG. 3A is a block diagram of the computer according to this invention;

FIG. 3B is block diagram of the expansion module of this invention;

FIG. 4 is a block diagram of the customized gate array in the hand held computer;

FIG. 5 is a block diagram of a preferred embodiment of the keyboard emulation system;

FIG. 6 is a flow chart illustrating the operation of the embodiment of FIG. 5;

FIG. 7 is a block diagram of the video control unit;

FIG. 8 is a block diagram depicting the character locations of a display and the address space of the display RAM;

FIG. 9 is a flow chart illustrating the operation of the video control system;

FIG. 10 is a schematic diagram of the keyboard scan control register configuration;

FIG. 11 is a schematic sectional elevation view showing the computer and the expansion module in a position wherein the expansion module is initially hooked into the bottom side of the computer, prior to the two being pivotally brought together;

FIG. 12 is a plan view showing the back or under side of the computer;

FIG. 13 is a sectional view of the recess door in its closed position;

FIG. 14 is a sectional view of the recess door in its open position;

FIG. 15 is a perspective view showing the expansion module disconnected from the computer, and particularly illustrating the top surface of the module;

FIG. 16 is a sectional elevation view illustrating connection members of the expansion module;

FIG. 17 is a perspective view showing a hand held computer as secured to a stand and handle device of the invention, which is shown in a position serving as a desk top stand;

FIG. 18 is a side elevation view showing the computer and stand/handle device in a position similar to that of FIG. 17;

FIG. 19 is a side elevation view similar to that of FIG. 18 but showing both the computer and attached expansion module supported by the stand;

FIG. 20 is a perspective view showing the computer and attached stand/handle device in a different position, with the device functioning as a carrying handle;

FIG. 21 is a perspective view showing the stand and handle device alone, in the stand mode, and showing a latching mechanism;

FIG. 22 is a perspective view showing the stand and handle alone, in folded configuration;

FIG. 23 is a view partially in section, showing one preferred form of hinge construction for the stand and handle device;

FIG. 24 is a block diagram of a standard video display system;

FIG. 25 is a schematic diagram illustrating the screen scan pattern;

FIG. 26 are schematic views of different orientations of the screen of the hand-held computer depicted in FIG. 1;

FIG. 27 is a flow chart illustrating the window reorientation procedure;

FIGS. 28A and 28B are schematic diagram illustrating the reorientation of a window display;

FIG. 29 is a flow chart illustrating the bit mapped image reorientation procedure;

FIG. 30A and 30B are schematic diagrams illustrating the reorientation of a bit mapped image;

FIGS. 31A and 31B depict the address space of the image data for the unrotated and reoriented images;

FIG. 32 is a flow chart illustrating the data reordering procedure;

FIGS. 33A-33D are schematic diagrams depicting reordered data;

FIGS. 34A and 34B are schematic diagrams illustrating the unrotated and rotated font storage formats; and FIGS. 35A and 35B are flow charts illustrating the font reorientation procedure.

DETAILED DESCRIPTION OF THE PREFERRED EMBODIMENT

FIG. 1 shows a hand held computer 10 having a display 12 and a stylus 29. In the preferred embodiment, computer 10 has a length of approximately 12½ inches, a width of approximately 9½ inches and a depth of approximately 1½ inches. Computer 10 has a weight of approximately 4 pounds. The sides 11 of computer 10 are curved to make an attractive and easily held package.

Display 12 occupies most of the frontal or top surface area of computer 10 and is surrounded by a relatively narrow frame or bezel 26. Frame 26 may have a series of function buttons or keys 28 which may interact with the computer software as the program may require.

Computer 10 may be used with an expansion module 16 as shown in FIGS. 2A and 2B. Expansion module 16 contains extra memory in the form of a hard disk drive and has ports for connection to peripheral devices as discussed more particularly below. Expansion module 16 has approximately the same dimensions as computer 10 and attaches to the underside of computer 10 to form a unitary structure. The weight of expansion module 16 depends on its contents, which may differ depending on the application.

The housings of both the computer and expansion module may be made of injection molded plastic as is known in the art. The housing parts may be attached and assembled as disclosed in the copending patent application entitled "Housing Assembly Fastening", assigned to the same assignee as the present invention and incorporated into this application by reference.

The combination of computer 10 and expansion module 16 may be hand held as shown in FIG. 2A or placed on a desk as shown in FIG. 2B. When used as a desktop computer, peripherals such as a printer 18, a floppy disk drive (not shown), and a keyboard 22 may be attached to the combination of computer 10 and expansion module 16 through ports 17 located on the sides of expansion module 16. In addition, a stand 24 may be attached to the computer and expansion module to place the display 12 in a more convenient position. A copending application entitled "Stand And Handle For Hand Held Computer" filed concurrently with this application, assigned to the same assignee as the present invention and incorporated into this application by reference, discloses the preferred embodiment of the stand.

Computer 10 is a stand alone data processor capable of running standard personal computer programs as well as specially designed software. Computer 10 may receive data and instructions from an electric stylus 29 which interacts with a display screen overlay 30; an internal modem 32; a serial port which may be connected to an optional external keyboard (not shown); and/or, when connected, from the expansion module 16. Computer 10 transmits data and other information through the visual display 12; the modem 32; an optional external printer (not shown); and/or, when connected, to the expansion module 16.

Visual display 12 is a reflective LCD display, preferably the Kyocra model KL-6440 AST-W. Display 12 is mounted beneath bezel 26 and over main logic board 28. In the preferred embodiment, display 12 covers most of the top surface of computer 10 in order to maximize the data input surface as discussed below. The portion of the top surface of computer 10 which is not devoted to display 12 is reserved only for (1) space for holding the computer without placing the user's fingers on the screen; (2) space for function buttons 28; and (3) space required by bezel 26 to hold display 12 in place.

Preferably, the transparent conductive screen overlay 30 is a 0.09 inch thick glass resistive overlay manufactured by Microtouch. Overlay 30 covers the screen of display 12 and is charged with a voltage gradient which alternates along the "x" and "y" axes. The voltage gradient is linearized as described in U.S. Pat. No. 4,371,746, the disclosure of which is incorporated herein by reference.

Stylus 29 has an electrically conductive tip which is connected via a cable 31 to a connector on main logic board 28. Stylus may be configured as described in copending applications "Pen Cord Tensioning Device" and "Conductive Stylus Storage For A Portable Computer", filed concurrently with this application, assigned to the same assignee as the present invention and incorporated into this application by reference. The housing of computer 10 may be configured to store the stylus when not in use as described in the "Conductive Stylus Storage For A Portable Computer" application referenced above. When stylus 29 touches screen overlay 30, stylus 29 transmits the magnitude of the voltage of overlay 30 at that point to an overlay controller within the computer. The overlay controller determines the screen coordinates of the point of contact. Thus, stylus 29 functions as an interactive pointer interface to programs being executed by computer 10. Stylus 29 therefore enables one-handed data entry by the user into computer 10.

FIG. 4A is a block diagram of the major components of computer 10. Internal modem 32 is a 2400 baud MNP model manufactured by U.S. Robotics. Modem 32 may be used in many ways. For example, modem 32 permits the user to send data recorded by computer 10 to a remote data storage device or to another computer. Modem 32 also permits the user to receive data via telephone lines from a remote source. Hence, computer 10 need not have extensive internal data storage, thereby minimizing its size and weight. In addition, modem 32 allows computer 10 to communicate on-line with a remote computer or data base, thereby increasing the computer's versatility and usefulness.

The optional external keyboard is an IBM XT compatible keyboard. The keyboard may be used as a data entry device in applications in which data entry via conductive overlay 30 is impractical. Computer 10, however, is designed to be fully functional without the use of a physical keyboard. Therefore, to minimize the size and weight of the computer, no physical keyboard is provided.

Computer 10 may receive power from a battery pack 34 or from a standard AC source converted to DC through an external AC/DC converter, such as a 17.25 volt, 1.25 amp unit built by Tamura, attached through an external jack. The computer's battery compartment may be configured as disclosed in copending application entitled "Battery Compartment," filed concurrently with this application, assigned to the same assignee as the present invention and incorporated into this application by reference. Computer 10 has been designed to minimize power requirements, thereby minimizing the size of the battery needed. One example of the power minimization is the use of "Standby Mode" as discussed below.

Battery pack 34 may be rechargeable as disclosed in copending application entitled "Externally Rechargeable Battery Pack For A Computer", filed concurrently with this application, assigned to the same assignee as the present invention and incorporated into this application by reference. A bridge battery 33 may also be provided for allowing the main computer battery to be removed and replaced without turning off the computer. This bridge battery may be configured as disclosed in copending application entitled "Computer With Provision For Continued Operation During Battery Change", filed concurrently with this application, assigned to the same assignee as the present invention and incorporated into this application by reference. An 8 watt, three output DC/DC converter 35 such as that manufactured by ITT is used to set the system voltage to the appropriate level.

The computer's internal memory consists of removable RAM cards 65; system ROM 66 (shown schematically); and system RAM 67 (shown schematically). The memory cards 65 contain software specific to the computer's application. Memory cards 65 are preferably Epson IC memory cards with an 8 bit data bus and 40-pin card edge connectors. Each has a small battery associated with it to maintain data for six or more months without drawing on the main unit power. Memory cards 65 may be made in accordance with the disclosure of the copending application entitled "Memory Card With Removal Tab" filed concurrently with this application, assigned to the same assignee as the present invention and incorporated into this application by reference.

The use of memory cards 65 in place of a conventional hard disk drive is another size and weight minimizing feature of this invention. Firmware is provided with computer 10 to cause the memory cards to emulate a disk drive, thereby making computer 10 compatible with conventional PC software without using a heavy and bulky disk drive to do so. The memory cards 65 may be accessed via a memory card door 68 in the housing of computer 10 such as that described in copending application entitled "Memory Card Door" filed concurrently with this application, assigned to the same assignee as the present invention and incorporated into this application by reference.

System ROM 66 contains standard system program instructions such as MS-DOS. Preferably, system ROM 66 consists of two 27C010 type, 128k by 8 bit EPROM's, but mask ROM types may be used instead. The two ROM chips are disposed in EPROM/ROM sockets on the main logic board 28. In the preferred embodiment, system RAM 67 consists of eight 256K×4 dynamic RAM's.

A microprocessor or CPU chip 50 is connected to the other components via a standard system bus 52. In the preferred embodiment, microprocessor 50 is an OKI MSM80C86A-10RS 16-Bit CMOS microprocessor. Also connected along system bus 52 are a dual serial/parallel port chip 54; a real time clock chip 56; a customized gate array 58; a system control chip 60; a customized system BIOS 62; and a display controller 64.

In the preferred embodiment, serial/parallel port chip 54 is a Chips and Technologies 82C605 CHIPSport multifunction controller. Real time clock chip 56 is a Dallas Semiconductor DS1287A chip. Preferably, system control chip 60 is a Chips and Technologies 82C100 Super XT system controller, and display controller 64 is a Yamaha PCDC V6366 Panel and CRT display controller. System control chip 60 provides all the core logic required to implement an XT compatible system board, including: a system clock; bus controller; DMA controller; interrupt controller; timer; parallel peripheral interface; keyboard interface; memory interface; input/output channel interface; extended memory system; power management control; clock switching logic; input/output channel timing control; and clock conversion logic.

The purpose of gate array 58 is to reduce the chip count and to provide an efficient bus interface for the specialized input/output devices with which computer 10 is used. Gate array 58 uses the control signals, address and data bits provided by the system core logic to allow access to the internal control registers of gate array 58 as well as to the peripherals to which it is attached. Gate array 58 is addressed through input/output ports on system bus 52, though the peripherals may be addressed as memory.

A block diagram of the customized gate array chip 58 is shown in FIG. 4. A standard bus interface and internal decode block 70 communicates with system bus 52. Connected to interface 70 are an auxiliary keyboard block 72; an auxiliary memory interface block 74; a miscellaneous input/output interface block 76; an overlay processor interface block 78; a programmable chip select block 80; and an LCD randomizer clock block 82.

Auxiliary keyboard block 72 provides a standard 8-bit latch as is known in the art. It connects to the hardware pertaining to the keyboard emulation program as explained below.

Auxiliary memory interface block 74 provides buffers and control ports to allow access to removable storage cards 65 and non-removable system ROM 66. Interface 74 is a paged interface with a 64k page size and a data bus 8 bits wide. Only one of the four devices (i.e., the two RAM cards and the two ROM's) may be accessed at a time. To select a device, the program sets the appropriate bit in the Auxiliary Memory Select Port. A Status Port is provided to allow determination of storage card type and presence. A Page Register Port is used to select the active 64k byte page in the selected device.

The miscellaneous input/output block 76 provides eight general purpose input pins and eight general purpose output pins. Block 78 provides an 8-bit buffer for bidirectional data transfer between two processors and interrupt/data available status bits in both directions. The processors utilize this resource through a simple protocol.

The programmable chip select block 80 provides 10 pins that can be used as input/output or memory decodes. The LCD randomizer clock block 82 provides a pseudo-random AC signal to the LCD. The logic in this block divides the clock from the LCD controller 64 by 68 and changes its phase every 289 clocks.

System BIOS 62 consists of two EPROM's. It is a standard IBM-compatible Input/Output System that has been modified to include program steps for three key systems: (1) the computer's disk drive simulation; (2) the computer's "standby" power-saving mode, and (3) the computer's keyboard emulation system. These three systems are described below.

The use of memory cards 65 in place of a disk drive saves space in, and reduces the weight of, computer 10. In addition, the RAM memory cards are faster than a disk drive and are more durable since they have no moving parts. The two MS-DOS ROM's 66 are concatenated by the BIOS 62 into one virtual disk device. Thus, the system emulates three floppy disk drives.

The sequence of events for a RAM card/MS-DOS floppy disk service request is as follows:
1. BIOS receives software interrupt 13h—floppy disk service request.
2. BIOS determines whether the request is for a physical floppy disk or a RAM card/MS-DOS ROM. This step is necessary because an 3.5 inch or 5.25 inch external floppy disk drive may be attached to computer 10 via the expansion module 16 as discussed below.
3. If the request is for a RAM card/MS-DOS ROM, program control is given to the RAM card driver. This driver takes different actions depending on the type of service request:
   a. Disk reset request—turn the RAM card system off;
   b. Read, Write, or Verify request—
      i. Power up the RAM card system;
      ii. Check to make sure the slot for the specified disk is not empty. Return an error if it is;
      iii. Seek to the specified head, track and sector. The head, track and sector is translated into a specific RAM card address by a conversion formula which depends on the capacity of the RAM card;
      iv. If the request is a write, check write protection. A physical switch on the RAM card provides the user with a way to write-protect the RAM card;
      v. Immediately before the data is read or written, enable the RAM card read/write buffers and disable interrupts. With interrupts disabled, no other software can execute. This keeps other software from corrupting the data on a RAM card by accidentally writing to its address range;
      vi. Transfer data with 8086 string instruction;
      vii. Disable the RAM card read/write buffers and re-enable interrupts. With the read/write buffers disabled, writes to the RAM card address range do not change the data on the RAM card; and
      viii. Return any error codes to the program that requested disk service.
   c. Format request—
      i. Get the disk parameter block for this media type, and get the format character;
      ii. For each sector to be formatted: (1) check track, head, and sector number for validity; (2) if out of range, do nothing; if in range, seek to that track and sector; (3) check the bytes/sector value; if not 02 h, return error 01 h; (4) enable the RAM card rad/write buffers and disable interrupts; (5) write the format character to that sector; (6) read the sector to ensure that it was formatted properly; (7) disable the RAM card read/write buffers and enable interrupts.
   d. Get disk parameters request—return the disk parameters for the maximum capacity RAM card/MS-DOS ROM the drive can use.
4. The driver must wait a short period of time after powering up the RAM card system before accessing it. Therefore, after a service request is completed, the RAM card system is left powered on. Leaving the system powered up improves performance but consumes more power than powering it off. Two seconds after the last RAM card/MS-DOS ROM operation, therefore, the RAM card system power is shut off.

The standby mode control is a power-saving system which reduces the computer's battery power requirements. This reduction saves space and reduces the weight of the computer. The program steps are stored in the system BIOS 62.

The standby sequence may be started in one of four ways: (1) by pressing a standby key on the face of the computer; (2) by opening the bus connector door on the bottom of the computer housing; (3) by system timeout, i.e., by leaving the computer inactive for a preselected period of time; or (4) by the detection of low battery voltage by the overlay control interface block 78 of the gate array 58. Any one of these four events triggers an interrupt signal in the CPU 50. The CPU 50 then disables all other interrupts. After waiting for all pending input/output operations to finish, the CPU saves the system state in system RAM 67.

The CPU reads the lowest 512 words of both banks of the system memory to insure the refresh count. The CPU then disables the system RAM refresh, sets the standby refresh on, and turns the main power off. A standby power supply (element 84 in FIG. 4A) maintains voltage to system RAM 67 and display RAM 86.

Standby mode may be exited only by activating the standby switch on the face of the computer 10. When the main power supply returns, the CPU tests a standby status indicator. If the CPU detects that the system was in standby mode, the CPU shuts off the standby mode refresh and restarts the system refresh. The CPU reads 512 words of both system RAM banks to insure refresh. The CPU restores the system state as read from the system RAM, enables interrupts, and returns to the process it was executing prior to entering the standby sequence.

As shown in FIGS. 5-10, the keyboard emulator permits the computer 10 to use PC software requiring keyboard inputs without the use of a physical keyboard, thereby eliminating the need to add the size, weight and bulk of a keyboard to the hand held package.

Screen 13 of display 12 has a 640×400 pixel configuration. PC-compatible application programs, however, utilize the CGA mode of 25 lines of characters on a 640×200 pixel grid. To compensate for the extra pixels when a keyboard emulation option is not used and an application program utilizing the CGA character mode is being executed, the system modifies the standard CGA image to fit the 640×400 pixel screen 13. This modification feature is transparent to the application program and results in the display of the application program graphics on the entire screen.

A keyboard, and possibly other graphics, are displayed on the bottom half 13b of the screen 13 by the keyboard emulation system (KBES) of the invention. Since the size of the top half of the screen 13t is the standard CGA size it is possible for the application program graphics to be displayed on the top half 13t and be unaffected by the presence of the displayed keyboard.

The keyboard display includes characters or graphics representing each key of a keyboard that would ordinarily be utilized by the application program. If a keystroke is required by the application program, the user selects a keystroke by touching the conductive stylus 29 to the location of the characters on the screen 13 representing the required keystroke. The selected keystroke data is supplied to the application program by the KBES as if the keystroke was generated by depressing and releasing a key on an actual keyboard. The presence of the keyboard display on the lower half of the screen 13b and the operation of the KBES is transparent to the application program and requires no modification to the application program or special procedures for the user. Additionally, the stylus 29 may continue to be used with the application program while also being used to supply keystroke data when the computer is in the keyboard emulation mode. For example, the stylus 29 may emulate a mouse when used to interact with the application program graphics displayed in the top segment 13t and be used to enter keystroke data by touching the display on the bottom segment 13b.

A block diagram of the KBES is depicted in FIG. 5. Referring now to FIG. 5, a system processor 50, video control system (VCS) 416, system memory (SMEM) 67, overlay controller 78, and keyboard scan code register 400, having an output connected to an interrupt line 400I, are coupled to the system data bus (DBUS) 52.

The VCS 416 is connected to the screen 13 by video signal and control lines 402 and 404. The overlay controller 78 is connected to the screen overlay by electrical interconnection lines 406 and is also connected to the conductive stylus 29 by the wire 31. During the keyboard emulation mode a BIOS 62, application program 408, terminate and stay resident keyboard emulation program (KPEP) 410, and look up table (LUT) 412 are stored in the SMEM 67.

The operation of the system of FIG. 5 will now be described with reference to the flow chart of FIG. 6. When the keyboard emulation mode is initiated the special TRS (terminate and stay resident) keyboard emulation program (KBEP) 410 is called. The KBEP 410 adjusts the VCS 416 to place the screen in the 50 character line mode to present a 25 line character mode to the application program and to display the application program graphics on the upper 25 line segment 13t of the screen 13. The KBEP 410 simultaneously displays a graphic depiction of a keyboard on the lower 25 line segment 13b of the screen 13.

The KBEP monitors the overlay controller 78 for the presence of a keyboard display interaction that occurs when a user touches the stylus 29 to the position of the character in the keyboard display representing a particular key that is to be selected. When a keyboard display interaction is detected the pixel coordinates provided by the overlay controller 78 are translated by the KPEP to a scan code representing the keystroke data indicated by the character contacted by the stylus 29.

There are several alternatives to displaying a keyboard in the bottom segment 13b. Labelled regions representing sets of keystrokes could be displayed. If a region were touched by the stylus 29 the coordinates would be translated to a series of corresponding scan codes by the KPEP 410.

Additionally, handwriting recognition software 414 stored in the system memory could be utilized to translate coordinates of alphanumeric characters, or other types of symbols such as Chinese or Japanese characters, written with the stylus 29 on the bottom half of the screen into corresponding keystroke scan codes. These scan codes would then be supplied to the application program by the KPEP 410.

One mode of implementing a translation is to store the scan codes represented by the character displayed on the screen in the location of the LUT 412 accessed by the coordinates of the location on the screen 13 of the character displayed on the screen. The KPEP utilizes the coordinates provided by the overlay controller 78 to access the scan code from the LUT 412.

The KPEP then stores the scan code in the keyboard scan code register 400. The hardware of the keyboard scan code register 400 is designed so that a signal is set on the interrupt line 400I when the scan code is stored in the keyboard scan code register 400.

FIG. 7 is a block diagram of a representative video control system 416 utilized in the preferred embodiment of the system. In FIG. 7, the system processor 50, a video control unit 64, and a display RAM 86 are connected by the DBUS 52 and address bus (ABUS) 418. Additionally, a pattern ROM 422 is connected to the ABUS 418 and to the video control unit 64 by a scan control line 420. The data output of the pattern ROM 422 is connected to the parallel input of a video shift register 424 and the serial output of the video shift register 424 is coupled to a display unit, including the screen 13, by the video line 402.

In standard character mode operation, the screen 13 is divided into a predetermined number of sequentially addressed character locations. The display RAM 86 includes the same predetermined number of sequentially addressed 8-bit storage locations with the address of each storage location corresponding to the address one of the character locations. During execution of an application program, the system processor 50 writes the ASCII code to be displayed at each character location in the display RAM storage location corresponding to the character location.

As is well known in the art, each character location is an m×n matrix of pixels. The m×n dot pattern for a particular ASCII character is stored at location in the pattern ROM 422 having an address partially formed by the ASCII code for the character to be displayed. The screen display is formed one pixel row at a time. Thus, during a display operation, the video control unit 64 sequentially transfers the addresses of the character locations in a given row of the display to the ABUS 418 so that the display RAM 86 outputs the ASCII code for each character to be displayed. In addition, a signal is transferred to the scan control line 420 that indicates which pixel row of the character matrix is to be displayed. The pattern ROM 422, in response to the ASCII code and scan control signal, transfer the correct pixel signals to the parallel input of the video shift register 424 which then serially shifts the pixel signals onto the video line 402.

The operation of the VCS 416 during the keyboard emulation mode will now be described with reference to FIGS. 8 and 9. FIG. 8 depicts the screen 13 in a 50 line mode and the address space 426 of the display RAM 86 to support the 50 line mode. The predetermined number (C1 to CP) of character locations 13c in the top half 13t of the screen represent the standard CGA character mode and are utilized to display the graphics of the application program. The first predetermined number (A1 to AP) of addresses in the first half 426t of the address space 426 correspond to upper display 13t and are accessible to the application program. The second predetermined number of addresses (AP+1 to A2P) in the second half 426b of the address space 426 correspond to character locations (CP+1 to C2P) of the lower half 13b of the screen and store the ASCII codes for the keyboard display. In the embodiment being described, hardware limitations require that address spaces 426t and 426b be contiguous. Generally, the address space 426t is not affected by an application program. However in other embodiments, hardware support could be provided to locate the address space 426b for the second segment display data in an area not accessible to the application program to assure complete isolation.

The operation of the system described with reference to FIGS. 7 and 8 will now be described with reference to the flow chart of FIG. 9. The video control unit is programmed to display a 50 character line mode. Since the screen is now divided into 50 character lines each character location is an m×n pixel matrix that correspond to the m×n pattern in the pattern ROM 422. Accordingly, the video control unit 64 is programmed to display each row of each character pattern only once. The top half 426t of the display RAM address space is allocated to the application program. Thus, the application program address space spans addresses A1 through AP so that the changing of video modes or erasing video memory does not affect the display of the keyboard on the lower half 13b of the screen 13.

FIG. 10 is a detailed block diagram of a keyboard scan code register 400 configuration that allows the KBEP to generate keyboard scan codes that cannot be distinguished in any way from real hardware scan codes generated by pressing and releasing a key on the keyboard of an IBM PC XT compatible computer (PC-XT). In FIG. 10, a first scan code shift register 428 has a serial input coupled to a KBI line 430, an enable input coupled to a KB type line 432 via invertor 434, a parallel output coupled to the DBUS 52, and a first interrupt output coupled to a first INT line 436. A second register 438 has a parallel I/O port coupled to the DBUS 52, an enable input coupled to the KB type line 432, and an second interrupt output coupled to a second interrupt line 440. A first AND gate 442 has first and second inputs coupled to the first INT line 436 and the inverted KB type line 432, respectively, and a second AND gate 444 has first and second inputs coupled to the KB type line 432 and the second INT line, respectively. The outputs of the first and second AND gates 442 and 444 are connected to an OR gate 446, with the output of OR gate 444 coupled to the interrupt line 400I. The first and second registers 428 and 438 are connected to the DBUS 52 at I/O port address 426H.

If an actual keyboard is connected to the computer, a false signal, reset when the computer is initialized or when the KPEP is terminated, on the KB type line indicates that the computer is not in the keyboard emulation mode, disables the second register 438, enables the first register 428, closes the second AND gate 444, and opens the first AND gate 442. In a PC-XT the scan code from the keyboard is serially shifted into the first shift register 428 through the KBI line 430. When the entire scan code has been shifted the first register 428 automatically generates a hardware interrupt signal on the first interrupt line 436. In response to this interrupt, a standard PC-XT interrupt service routine reads the data from I/O port address 426H and services the interrupt. The interrupt service routine processes the scan code stored in the first register 428 and issues an end of interrupt (EOI) signal to reset the interrupt generated by the first register 428.

In the keyboard emulation mode, a true signal on the KB type line 432, set by the KPEP, indicates that the computer is in the keyboard emulation mode, enables the second register 438, disables the first register 428, opens the second AND gate 444, and closes the first AND gate 442. When a keyboard interaction causes the KBEP to generate the scan code of the key selected from the keyboard display, the KBEP stores the scan code in the second register 438. The second register 438 automatically generates an interrupt signal on the second interrupt line 440 when the keystroke scan data is written to the second register 438.

The hardware generation of the interrupt by the second register 438 in the keyboard emulation mode is necessary if the keyboard emulation mode is to be transparent to the application program. If the interrupt were generated by software a non-standard interrupt service routine would be required that does not assume a hardware interrupt.

Expansion module 16 is shown schematically in FIG. 3B. Expansion module 16 has a main logic circuit board 102, a small hard disk drive 104, a battery pack 106 identical to battery pack 34 of computer 10, a DC/DC converter 108 identical to that of computer 10, a floppy disk controller 110, and a series of ports 17. In the preferred embodiment, floppy disk controller is a National DP8743. The hard drive is a PrairieTek Prairie 220 XT drive. It should be noted that, depending on the application, expansion module 16 may contain any data storage, data transmission or data receiving device that may be used together with the devices contained in computer 10.

System bus 102 communicates with expansion bus 100. Hard disk 104 and its interface communicate with system bus 112, as does floppy disk interface 110. Also communicating with the expansion bus 100 are: a parallel interface 114 and associated standard parallel port buffers 116; a standby control signal carrier 118 and a power bus 120, both leading to DC/DC convertor 108; and a keyboard interface 122 leading to a standard keyboard connector and an optional external keyboard 22.

The expansion bus connector 100 is a 100-pin connector with pins dedicated as follows: pins 1-60 are for an IBM PC-XT compatible system bus; pins 61-65 are for an IBM PC compatible keyboard interface; pin 66 is for the stylus signal; pin 67-68 are for a Centronix compatible parallel printer interface; and pins 87-100 are for general purpose control of expansion module device and power control.

The connection between the computer 10 housing and the expansion module 16 housing is as follows. In FIG. 2A, the computer 10 is shown connected to expansion module 16 immediately beneath the computer. As illustrated, when these two components 10 and 16 are mated, they appear generally as a single computer unit. Both the under side of the computer 10 and the upper surface of the expansion module 16 preferably are substantially flat (or complementarily shaped), so that the two can be closely brought together in the mated position as illustrated.

FIG. 11 shows schematically the connection of the computer 10 to expansion module 16. FIG. 11 should be viewed in conjunction with FIG. 12, which shows the bottom surface 140 of the computer 10, revealing two pairs of slotted openings 142 and 144. In FIG. 11 the computer 10 and the expansion module 16 are shown in an oblique relationship to each other, wherein a pair of stationary hooking elements 146 of the expansion module 16 are being hooked into the horizontal or lateral slotted openings 142 in the bottom of the computer 10. As can be envisioned in FIG. 11, in a preferred embodiment the hooking elements 146 will not enter the slotted openings 142 unless the two computer components 10 and 16 are tipped at a somewhat oblique angle with respect to each other.

As also shown schematically in FIG. 11, the 100-pin expansion bus connection 150 is automatically made as the computer 10 and the module 16 are pivotally brought together after engagement of the hooking elements 146. The computer bus connector 150a, positioned within a recess 152 within the bottom or under side 140 of the computer 10, is engaged with a mating bus connector 150b which protrudes upwardly from the expansion module 16. The recessed connector 150a gin the computer enables the computer 10 to be conveniently used alone, as for field use, without the obstruction of any protrusions at the under side of the computer.

The connection of the expansion module 16 to computer 10 could induce detrimental transients in the computer RAM and circuits. The computer therefore may be provided with a protective door and deactivation switch as shown in FIGS. 13 and 14 for placing the computer in standby mode during the connection process.

The computer's main logic printed circuit board 28 lies within the computer adjacent under side 140. A movable door 154 is disposed in grooves 155 formed in under side 140. Door 154 slides in grooves 155 to open and close recess 152. A handle 156 extends downward from door 154 to facilitate movement of door 154 by the user.

Extending upward from door 154 toward circuit board 28 is a switch actuator 158. In the preferred embodiment, door 154, handle 156 and actuator 158 are formed as a unitary piece of injection molded plastic. The top surface 160 of actuator 158 lies adjacent circuit board 28 but far enough away to prevent contact between actuator 158 and any elements mounted on circuit board 28.

A switch 162 extends downward from circuit board 28 toward under side 140. Switch 162 is mounted in a position in which actuator 158 contacts and depresses activation button 164 on switch 162 when door 154 is opened more than halfway. In its activated position, switch 162 closes a contact (not shown) which causes the computer to begin its standby mode sequence, as described above.

As shown in FIG. 13, button 164 is biased by spring 166 to its non-activated position. Button 164 has a surface 168 which abuts a shoulder 170 formed on the housing of switch 162 to prevent movement of button 164 beyond its activated position. In the preferred embodiment, the total movement of button 164 from its non-activated position to its activated position is 0.052 inches.

FIG. 11 indicates the connection made to the slotted openings 148 at the opposite end of the computer bottom, as the computer 10 and expansion module 16 are brought into final proximity for engagement together. As illustrated, the expansion module 16 includes a pair of slidable hooks 170 which can be moved back and forth in a longitudinal direction of the expansion module 16. The slidable hooks 170 are moveable in unison and are spring loaded toward a latching position, i.e., to the right as seen in FIG. 11.

Immediately above the slidable hooks 170 are the longitudinally oriented slotted holes 172, as seen in FIG. 11. Further movement of the computer 10, swinging down against the top of the expansion module 16, will engage a ramp-like surface 174 of each of the slidable locking hook members 170 against an edge 174 of the longitudinal locking slot 148. The downward movement of the computer 10 will cam the slidable locking hooks 170 back toward a retracted position (to the left as seen in FIG. 11), so that the locking hooks clear the slot edge 174 and snap through the longitudinal slotted holes 172. The locking hooks 170 are then moved by the spring force to the right, locking over the computer bottom structure and firmly retaining the computer 10 and expansion module 16 closely together.

FIG. 15 shows the expansion module 16 with a preferred embodiment of a sliding hook/latching mechanism for the locking hooks 170. As shown in FIG. 15, the two locking hooks 170 may be formed integrally as part of a spring-loaded sliding bracket 176 which is slidable longitudinally within the expansion module 16. The bracket 176 may be an integral plastic member which also includes a pair of spring flanges 178 which engage against a wall-like surface 180 within the module 16 as illustrated. These spring flanges 178 provide an integral plastic spring which is constantly urging the locking hooks 170 toward the locking, engaged position.

FIG. 16 shows the sliding bracket member 176 in sectional view within the expansion module 16. As indicated, in its sliding motion it may ride on low friction surfaces 182 at outboard positions, and also on similar low friction glide surfaces 184 via a split-T shaped member 186 at an inboard position, preferably integral with the bracket 176 and between the plastic spring flange structures 178. Other structure 188 and 190 holds the relatively wide sliding bracket 38 down in the proper position against upward movement, as illustrated particularly in FIG. 16.

For release of the computer 10 from the expansion module 16, an opening 192 in the front edge of the module exposes a tab or button 194 which comprises a front face of the slidable bracket 176. Finger pressure on the tab 194 will push the bracket back against the force of the spring flanges 178 so as to retract the locking hooks 170 and permit separation of the components.

Computer 10, or, when attached thereto, the combination of computer 10 and expansion module 16 may be set up as a desktop computer by using peripheral devices such as a printer and an external floppy disk drive. All connections to computer 10 and to expansion module 16 (except for the expansion bus connection between computer 10 and expansion module 16) are through ports located on the sides of computer 10 and expansion module 16. This feature simplifies the connection of the peripherals and makes operation of computer 10 as a desktop computer more convenient.

In addition, since expansion bus 100 may communicate power and data signals between computer 10 and expansion module 16, all peripherals may be connected to expansion module 16 only. This feature enables computer 10 to be disconnected and carried away from expansion module 16 without disconnecting the peripheral devices connected to expansion module 16. After the use of computer 10 in the field is complete, computer 10 may be reconnected to expansion module 16 and to all the peripheral desktop devices by a single connection, i.e., expansion bus 100.

FIGS. 17 and 18 show a combination stand and handle arrangement for use when computer 10 or the combination of computer 10 and expansion module 16 is used as a desktop computer. The stand and handle device 200 includes a pair of plate-like arms 202 and 204 which are pivotally secured together by a hinge 206. In this preferred embodiment each of the arms 202 and 204 comprises for the most part a generally flat plate. The arm 204 is a base arm, preferably flat-bottomed for engaging a horizontal surface such as a desk top. As shown in FIGS. 18 and 20, it may have resilient pads 208 for engaging against the desk surface.

The other arm 202, which is secured to the back side of the computer 10, is generally flat but may be shaped to conform to the shape of the back side of the computer, as shown in FIG. 18. A pair of structural members 210 connect the body of the plate-like arm 202 to the hinge 206, with an opening 212 left between the members 210 and adjacent to the hinge 206 to enable a user's fingers to wrap around the hinge in a carrying mode of the invention shown in FIG. 20.

As shown in FIG. 20, the base plate or arm 204 has a corresponding opening 212 which provides adequate space about the hinge 206 for comfortable gripping when the computer 10 is to be carried into the field.

FIG. 19 shows the stand and handle device 200 similar to FIG. 18, but with both the hand held computer 10 and an expansion module 16. In accordance with the invention, the connection plate or arm 202 of the stand/handle device has a snap-on connection system which will engage the back of the expansion unit 16 in the same way it engages the back side of the computer 10 itself. This connection system is further described below with reference to FIG. 21.

The hinge 206 preferably has a relatively large outer cylindrical surface as illustrated to provide a comfortable grip to the user.

FIG. 21 shows one preferred means for securing the first arm or computer back plate 202 to the back side of the computer, although other arrangements can be used. The plate 202 preferably includes a pair of spring-biased hook-shaped latches 214. These movable hooks 214 cooperate with stationary hooks 216 at an opposite end. The stationary hooks 216 are first hooked into slots in the back of the computer (or expansion module). As described above in the discussion of the connection between the computer 10 and the expansion module 16, hooks 214 are cammed back to a retracted position against the force of springs 218 when the ramp-like hooks 214 engage corresponding slots in the back of the computer 10 (or in the back of the expansion module 16, FIG. 19). The springs 218 then snap the locking hooks into a locked position in engagement with the back of the computer or expansion module, whereby the four hooks 214 and 216 firmly hold the plate 202 to the computer component. A release button 220 enables manual retraction and release of the movable hooks 214 when the stand/handle device 200 is to be removed.

In a preferred embodiment the structure of the hinge 206 includes provision for holding the base plate or arm 204 in the closed position shown in FIGS. 20 and 22 and in multiple positions between the closed position and a limit-defined fully extended position, for different stand tilt angles as selected by the user. The limit to opening of the arm 204 may be, for example, about 85 degrees, assuring stability of the computer 10 on a desk top even at full extension.

One embodiment of such a position holding device comprises the provision of a frictional resistance in the hinge 206 and is illustrated in FIG. 23. The handle/hinge 206 has a central casing 222 which spaces the two structural members 210 apart, and a tension rod 224 inside the hinge, with a threaded manual knob 226 for increasing or decreasing pressure on a spring 228. This pressure is transferred to a series of stacked friction rings at 230 and also at 232, positioned between adjacent structural members 210 of the plates 202 and 204 as shown. One or more pins 234 are engaged in arcuate slots 236 to limit the permitted range of pivotal motion.

Thus, the user can adjust spring pressure and friction in the hinge as needed. Increased pressure will more securely lock the stand/handle in the desk top display position shown in FIGS. 17, 18, 19 and 21 as well as in the closed position of FIGS. 20 and 22 when desired.

The drawings illustrate the computer 10 as positioned in horizontal or "landscape" mode on the stand and handle device 200. Provision could also be made for accommodating the vertical or "portrait" mode on the stand/handle 200, but the landscape mode is generally more important in desk top uses because it is the mode of MS-DOS and PC compatible computer software.

A display rotation program is included in the system ROM of computer 10 for changing the operation of computer 10 between the landscape and portrait modes. The program permits the rotation of the computer and, therefore, of the display, while maintaining a constant graphics display from a fixed viewpoint. This program permits the display 12 of computer 10 to be used in any of four orientations.

In FIG. 24, CPU 50 transfers image data specifying the image to be displayed to a display memory 86. A video display controller 64 transfers display data to display 12, having a screen 13, and generates control signals to control the display scan operation of the display 12. Program and other data is stored in system memory, shown diagrammatically as element 300.

The screen 13 is depicted in more detail in FIG. 25. The screen is organized into a matrix of pixel locations 302. Each pixel location is uniquely identified by an x-coordinate identifying the horizontal scan row 304 and a y-coordinate identifying the pixel column position 306 that includes the pixel. To form a simple monochromatic image the screen is scanned one row at time and the pixel location is either activated to form a black dot or not activated to form a white dot. Each row is scanned from right to left starting from the row at the top of the screen. When one scan is finished the next scan is started again from the actual scan origin 308, i.e., the point having the lowest value of x and y.

There is a direct mapping between the address space of the display memory 86 and the pixel locations of the screen 13. For the monochromatic display the image data consists of one bit for each pixel. Thus, it is possible to describe the image in terms of the pixel locations on the screen 13 or the address space of display memory 86. In the preferred embodiment the invention is implemented as reorientation software routines 300a stored in the system memory 300.

Depending on the nature of the display and particular application, it may be desirable to present the display in a portrait 310 or landscape 312 orientation as depicted in FIG. 26. Further, it is more convenient for a right-handed person to have the pen 29 tethered on the right side of the computer and for a left-handed person to have the pen 29 tethered on the right side of the computer. When the screen is rotated the angle of the rotation is provided to the system through the user interface.

For each orientation of the screen the origin 308 of the scan pattern is fixed to a particular physical point of the screen as illustrated in FIG. 26. Thus, if the image is reoriented to compensate for the rotation of the screen it must be changed to compensate for the shifting of the screen origin relative to the reoriented image.

Many application programs divide the display into screen segments, or windows, and simultaneously display different images in the windows. The window reorientation operation to compensate for screen rotation will now be described with reference to FIGS. 27, 28A and 28B.

In FIG. 28A, the screen is shown in its unrotated orientation with the actual screen origin 308 positioned at the upper right hand corner of the screen 13. A first window 314 has its actual origin 316, i.e., the pixel position in the image having the lowest values of the actual x and y coordinates and identifying the first pixel position in the scan pattern that includes a pixel in the image, at coordinates $x_a, y_a$ with its actual height consisting of NR rows of pixels and its actual width consisting of NC column pixel positions in each row.

FIG. 28B depicts a reoriented screen 13R that has been rotated counterclockwise 90° (rotation east) and a reoriented first window 314R having dimensions changes and screen location changes to compensate for the rotation of the screen.

The actual screen scan origin 308 of the rotated screen 13R is at the bottom right hand corner of the rotated screen 13R. The pixel positions in each row are scanned from bottom to top and the rows are sequentially scanned from the left side of the reoriented screen 13R to the left side. A reoriented window 314R has a logical origin 314L measured relative to the upper left-land corner of the rotated screen 13R. NC column positions in NR rows, offset relative to the actual origin 314A of reoriented window 13R, are allocated to the reoriented window 13R.

As depicted in FIG. 28B, the dimensions of the screen 13 and window 314 may be such that the entire window will not fit on the screen when reoriented. The data that would normally be displayed in the section off the screen is not included in the display and the reoriented window 314R is clipped.

Referring now to FIG. 27, a procedure for reorienting the windows 314 is depicted. First, the pen contact overlay and screen orientations are set according to the current screen orientation. If the screen is rotated east or west the window dimensions, NR and NC, are swapped so that the reoriented window 314R is formed of NR column pixel positions in NC scan rows. The procedure then loops through each window in the list and determines whether the window must be clipped. If so, the dimensions are swapped and the necessary clipped data is not displayed. The fonts are then reoriented as described below.

If the screen is turned upside down (rotated south by 180°) then the dimension swap and clipping steps are not required. The windows dimensions need not be changed.

The reorientation of a bit-mapped image will now be described with reference to the flow chart of FIG. 29 and FIGS. 30A and 30B. In FIG. 30A the screen is in an unrotated position with the screen origin 316 at the top right-hand corner. A rectangular bit-mapped image 318 has logical origin coordinates $(x_a, y_a)$ 320 indicating the displacement from the screen origin 308, an actual width ($W_a$) of NC pixel column positions and an actual height ($H_a$) of NR rows. The screen has an actual width ($SW_a$) of M columns and an actual height ($SH_a$) of N rows.

In FIG. 30B the screen is rotated 90° counterclockwise (orient east). The actual scan origin 308 of the rotated screen 13R is located at the lower left-hand corner of the rotated screen. However, the logical origin 320L of the rotated display 318R is displaced from the upper left-hand corner of the rotated screen 13R. The actual origin 320A of the rotated display 318R is located at the lower left-hand corner of the rotated display 318R. The logical width and height of the rotated display 318R correspond to the number of columns and rows in the scan pattern required to form the rotated image 318R.

Referring to FIG. 29, the procedure for reorienting the rectangular display 318 will now be described. The orientation of the screen is determined by steps A, B, and C. If the screen has been rotated east, as in FIG. 30B, the coordinates of the actual origin $(x_a, y_a)$ 320A and the actual height ($H_a$) and width ($W_a$) are assigned the values listed in step D. The values of the actual origin and height and width for the cases of a rotation west or east are listed in steps E and F. The calculation of the bytes per line of step G will be described with reference to FIGS. 31A and B.

FIGS. 31A and 31B illustrate the allocation of memory to store the bit-mapped images depicted in FIGS. 30A and 30B, respectively. In FIG. 31A it is assumed that the number of rows in the bit-mapped image (NR) is 10 and the number of columns (NC) is 6. The lowest address corresponds to the actual origin 320 of the unrotated display 318 and the row and column addresses of the pixel data are offset from the lowest address. In this example, each row word includes two bytes of data and 20 bytes of memory are required to store the pixel data of the unrotated image.

In FIG. 31B the lowest address corresponds to the actual origin 320A of the rotated image 318R. Note that the number of rows is now equal to NC and the number of columns is NR. The data in each row in filled to the nearest word boundary in the display memory 86. Because of the reorientation of the image, the column data of the unrotated image 318 is rewritten as row data of the reoriented image 318R. Only 12 bytes of memory are required to store the rotated image because of better alignment of the row data to the word boundaries.

Thus the calculation of step G of FIG. 29 for an east or west orientation requires a determination of the number of words required to store the column pixel data of the unrotated image.

The procedure for reordering data in a bit-mapped image to compensate for rotation o the screen 13 will now be described with reference to FIGS. 32 and 33A-D. FIGS. 33A-D depict the screen 13 and actual scan origin 308 for an unrotated, rotated east, rotated west, and rotated south screen respectively.

Referring now to FIG. 32, the screen orientation is determined and a temporary buffer is allocated for the display data. The procedure for determining the starting address and allocation of memory has been described above with reference to FIG. 29.

If the screen has been rotated east, the data in each column of the unrotated image data is reverse-ordered and written to the corresponding row in the temporary buffer. For a rotation west, the column numbers of the rotated image data are reverse-ordered and then each column is written to the corresponding row of the temporary buffer. For a rotation south, the row numbers of the unrotated image data are reverse ordered and each row is written to the corresponding row of the temporary buffer.

The old buffer is then freed and a variable is set to indicate that the image data has been reoriented to compensate for the rotation of the screen. Thus, when the image is displayed on the rotated screen it will be correctly displayed.

The rotation of font characters stored in memory will now be described with reference to FIGS. 34A, 34B, 35A and 35B. The font format is depicted in FIGS. 34A and 34B. A font header encodes information, including orientation information, about the font characters. The characters are a bit-mapped images of standard height but varying widths. The beginning address of each character image is determined from a bit offset field 322 and the width of each character is determined from a character width field 324. The character image bit are stored in character fields 326. As illustrated with reference to FIG. 31, differing amounts of storage are required by the various orientations of an image. Thus, when the font is loaded unused memory space 328 is allocated to compensate for the crossing memory word boundaries due to asymmetric characters. The actual character bits are rotated as described above for the bit-mapped display.

The procedure for reorienting the fonts is depicted in FIG. 35A. A temporary buffer is allocated and the font is rotated as required. The orientation byte in the header is changed to reflect the orientation. As depicted in greater detail in FIG. 35B, the font data is copied into the temporary buffer the remainder of the buffer is initialized to 0. The character width and offset 324 and 326 is copied to the buffer. The character bit-mapped display is the rotated as described above and the width, offset, and other indices are updated. The procedure loops until all the characters in the font have been rotated.

The hand held computer described above can be used for one-handed data entry in remote locations. The screen and stylus data entry system permits the use of handwriting recognition and preprogrammed forms for data entry. In addition, while the computer's design differs from standard PC architecture in several significant ways, the computer is compatible with standard PC software.

The computer may be used as a portable hand held device or it may be attached to peripheral devices and used as a desktop computer. Use of the expansion module enables the computer's memory to be expanded in hand held operation and enhances the use of the computer in desktop mode.

While this description has been made with reference to the preferred embodiment, modifications may be made as is known in the art without departing from the scope of the invention as defined by the following claims.

What is claimed is:

1. A computer assembly comprising:
   a portable, hand held computer comprising means for receiving data from an external source; means coupled to said receiving means for processing data, said means being compatible with standard personal computer software;
   memory storage means in communication with the means for processing data;
   a display coupled to said processing means;
   power means for supplying power to said data receiving means, said processing means and said memory storage means; and
   means coupled to said processing means for transmitting processed data to an external receiver; and
   expansion module means for converting the portable, hand held computer into a desktop computer, said expansion module means being devoid of a physical keyboard and comprising:
   memory means;
   means for receiving power from a source external to said module;
   means for receiving data from an external source;
   means for transmitting data to a receiver external to said module; and
   means coupled to said power receiving means, said data receiving means and said data transmitting means for communicating data, power and ground to and from the hand held computer;
   wherein the hand held computer is operable as a stand alone data receiver, processor and transmitter without the means for converting.

2. The assembly of claim 1 wherein the expansion module means for communicating comprises a bus connector for connecting with a corresponding bus connector on the hand held computer.

3. The assembly of claim 1 wherein the expansion module means for receiving data from an external source comprises a keyboard port.

4. The assembly of claim 1 wherein the hand held computer means for receiving data from an external source comprises a keyboard port.

5. The assembly of claim 1 wherein the expansion module means for transmitting data to an external receiver comprises a printer port.

6. The assembly of claim 1 wherein the expansion module means for transmitting data to an external receiver comprises a modem port.

7. The assembly of claim 1 wherein the hand held computer further comprises means for receiving power from an external source.

8. A computer assembly comprising:
  (a) a portable, hand held computer comprising:
     (i) a housing including a bottom surface and a perimeter wall;
     (ii) means for receiving data from an external source;
     (iii) means coupled to said receiving means for processing data, said means being compatible with standard personal computer software;
     (iv) memory storage means in communication with the means for processing data;
     (v) a display coupled to said processing means;
     (vi) power means for supplying power to said receiving means, said processing means and said memory storage means; and
     (vii) means coupled to said processing means for transmitting processed data to an external receiver; and
  (b) means for converting the portable, hand held computer into a desktop computer, the means for converting comprising an expansion module, the expansion module comprising:
     (i) a housing having a top surface and a perimeter wall, the top surface of the expansion module housing substantially conforming to the bottom surface of the computer housing and the perimeter wall of the computer housing and the expansion module housing having substantially similar extend;
     (ii) memory means;
     (iii) means for receiving power from an external source;
     (iv) means for receiving data from an external source;
     (v) means for transmitting data to an external receiver; and
     (vi) means coupled to said memory means, said data receiving means, said power receiving means and said data transmitting means for communicating data, power and ground to and from the hand held computer,
  said memory means, said power receiving means, said data receiving means and said data transmitting means being located within said expansion module housing,
  wherein the hand held computer is operable as a stand alone data receiver, processor and transmitter without the means for converting.

9. The assembly of claim 8 wherein the top surface of the expansion module housing and the bottom surface of the computer housing have means for connecting a communication bus between the computer and the expansion module.

10. The assembly of claim 9 wherein the outer perimeter surface of the computer housing has ports for accessing the interior of the computer.

11. A computer assembly comprising:
  (a) a portable, hand held computer comprising:
     (i) a housing having an outer perimeter surface;
     (ii) means for receiving data from an external source;
     (iii) means coupled to said receiving means for processing data, said means being compatible with standard personal computer software;
     (iv) memory storage means in communication with the means for processing data;
     (v) a display coupled to said processing means;
     (vi) power means for supplying power to said receiving means, said processing means and said memory storage means; and
     (vii) means coupled to said processing means for transmitting processed data to an external receiver; and
  (b) means for converting the portable, hand held computer into a desktop computer, the means for converting comprising an expansion module, the expansion module comprising:
     (i) a housing having an outer perimeter surface substantially the same width and length dimensions as the outer perimeter surface of the computer housing;
     (ii) memory means;
     (iii) means for receiving power from an external source;
     (iv) means for receiving data from an external source;
     (v) means for transmitting data to an external receiver; and
     (vi) means coupled to said data receiving means, said power receiving means and said data transmitting means for communicating data, power and ground to and from the hand held computer,
  said memory means, said power receiving means, said data receiving means and said data transmitting means being located with said expansion module housing,
  wherein the hand held computer is operable as a stand alone data receiver, processor and transmitter without the means for converting.

12. A computer assembly comprising:
  (a) a portable, hand held computer comprising:
     (i) means for receiving data from an external source;
     (ii) means coupled to said receiving means for processing data, said means being compatible with standard personal computer software and including a plurality of semiconductor chip components;
     (iii) memory storage means in communication with the means for processing data;
     (iv) a display coupled to said processing means;
     (v) power means for supplying power to said receiving means, said processing means and said memory storage means;
     (vi) means for enabling the number of semiconductor chip components in the means for processing data to be reduced, the means for enabling comprising a semiconductor gate array; and
     (vii) means coupled to said processing means for transmitting processed data to an external receiver; and
  (b) means for converting the portable, hand held computer into a desktop computer, the means for converting comprising an expansion module, the expansion module comprising:
     (i) memory means;

(ii) means for receiving power from an external source;

(iii) means for receiving data from an external source;

(iv) means for transmitting data to an external receiver; and (v) means coupled to said data receiving means, said power receiving means and said data transmitting means for communicating data, power and ground to and from the hand held computer, said memory means, said power receiving means, said data receiving means and said data transmitting means being located within said expansion module housing, wherein the hand held computer is operable as a stand alone data receiver, processor and transmitter without the means for converting.

13. A computer assembly comprising:
(a) a portable, hand held computer comprising:
   (i) means for receiving data from an external source;
   (ii) means coupled to said receiving means for processing data, said means being compatible with standard personal computer software, the means for processing data comprising a central processing unit having a plurality of system states during operation thereof;
   (iii) memory storage means in communication with the means for processing data;
   (iv) a display coupled to said processing means;
   (v) power means for supplying power to said receiving means, said processing means, said memory storage means and said display means;
   (vi) means coupled to said processing means and said memory storage means for saving power when the computer is temporarily not in use, the means for saving power comprising:
      (1) means for interrupting the operation of the central processing unit;
      (2) means for storing the system state in the memory storage means;
      (3) means for retrieving the system state from the memory storage means; and
      (4) means for resuming operation of the central processing unit at the state at which its operation was interrupted; and
   (vii) means coupled to said processing means for transmitting processed data to an external receiver; and
(b) means for converting the portable, hand held computer into a desktop computer, the means for converting comprising an expansion module, the expansion module comprising:
   (i) memory means;
   (ii) means for receiving power from an external source;
   (iii) means for receiving data from an external source;
   (iv) means for transmitting data to an external receiver; and
   (v) means coupled to said memory means, said data receiving means, said power receiving means and said data transmitting means for communicating data, power and ground to and from the hand held computer, said memory means, said power receiving means, said data receiving means and said data transmitting means being located with said expansion module housing, wherein the hand held computer is operable as a stand alone data receiver, processor and transmitter without the means for converting.

14. A computer assembly comprising:
(a) a portable, hand held computer comprising:
   (i) means for receiving data from an external source;
   (ii) means coupled to said receiving means for processing data, said means being compatible with standard personal computer software;
   (iii) memory storage means in communication with the means for processing data;
   (iv) a display coupled to said processing means;
   (v) means coupled to said processing means for rotating the presentation of information on the display from one orientation to another;
   (vi) power means for supplying power to said receiving means, said processing means, said memory storage means and said display means; and
   (vii) means coupled to said processing means for transmitting processed data to an external receiver; and
(b) means for converting the portable, hand held computer into a desktop computer, the means for converting comprising an expansion module, the expansion module comprising:
   (i) memory means;
   (ii) means for receiving power from an external source;
   (iii) means for receiving data from an external source;
   (iv) means for transmitting data to an external receiver; and
   (v) means coupled to said memory means, said data receiving means, said power receiving means and said data transmitting means for communicating data, power and ground to and from the hand held computer, said memory means, said power receiving means, said data receiving means and said data transmitting means being located with said expansion module housing, wherein the hand held computer is operable as a stand alone data receiver, processor and transmitter without the means for converting.

15. A computer assembly comprising:
(a) a portable, hand held computer comprising:
   (i) means for receiving data from an external source without the use of a physical keyboard;
   (ii) means coupled to said receiving means for processing data, said means being compatible with standard personal computer software;
   (iii) memory storage means comprising random access memory cards in communication with the means for processing data;
   (iv) a display coupled to said processing means;
   (v) power means for supplying power to said data receiving means, said processing means and said memory storage means;
   (vi) means coupled to said processing means for transmitting processed data to an external receiver; and
   (vii) means associated with the random access memory cards for emulating the operation of a hard disk drive, (b) means for converting the portable, hand held computer into a desktop computer, wherein the hand held computer is operable as a stand alone data receiver, processor and transmitter without the means for converting.

16. A computer assembly comprising:
(a) a portable, hand held computer comprising:
  (i) means for receiving data from an external source without the use of a physical keyboard;
  (ii) means coupled to said receiving means for processing data, said means being compatible with standard personal computer software and including a plurality of semiconductor chip components;
  (iii) memory storage means in communication with the means for processing data;
  (iv) a display coupled to said processing means;
  (v) power means for supplying power to said data receiving means, said processing means and said memory storage means;
  (vi) means for enabling the number of semiconductor chip components in the means for processing data to be reduced, the means for enabling comprising a semiconductor gate array; and
  (vii) means coupled to said processing means for transmitting processed data to an external receiver;
(b) means for converting the portable, hand held computer into a desktop computer, wherein the hand held computer is operable as a stand alone data receiver, processor and transmitter without the means for converting.

17. A computer assembly comprising:
(a) a portable, hand held computer comprising:
  (i) means for receiving data from an external source without the use of a physical keyboard;
  (ii) means coupled to said receiving means for processing data, said means being compatible with standard personal computer software, the means for processing data comprising a central processing unit having a plurality of system states during operation thereof;
  (iii) memory storage means in communication with the means for processing data;
  (iv) a display coupled to said processing means;
  (v) power means for supplying power to said receiving means, said processing means and said memory storage means;
  (vi) means coupled to said processing means for saving power when the computer is temporarily not in use, the means for saving power comprising:
    (1) means for interrupting the operation of the central processing unit;
    (2) means for storing the system state in the memory storage means;
    (3) means for retrieving the system state from the memory storage means; and
    (4) means for resuming operation of the central processing unit at the state at which its operation was interrupted; and
  (vii) means coupled to said processing means for transmitting processed data to an external receiver; and
(b) means for converting the portable, hand held computer into a desktop computer, wherein the hand held computer is operable as a stand alone data receiver, processor and transmitter without the means for converting.

18. A portable, hand held computer comprising:
means for receiving data from an external source;
means coupled to said receiving means for processing data, said means being compatible with standard personal computer software;
memory storage means comprising random access memory cards in communication with the means for processing data;
a display coupled to said processing means;
power means for supplying power to said receiving means, said processing means, said memory storage means and said display;
means coupled to said processing means for transmitting processed data to an external receiver; and
means associated with the random access memory cards for emulation the operation of a hard disk drive.

19. A portable, hand held computer comprising:
means for receiving data from an external source without the use of a physical keyboard;
means coupled to said receiving means for processing data, said processing means being compatible with standard personal computer software;
memory storage means comprising random access memory cards in communication with the means for processing data;
a display coupled to said processing means;
power means for supplying power to said receiving means, said processing means, said memory storage means and said display;
means coupled to said processing means for transmitting processed data to an external receiver; and
means associated with the random access memory cards for emulating the operation of a hard disk drive.

* * * * *